US012718824B2

(12) United States Patent
Xia et al.

(10) Patent No.: US 12,718,824 B2
(45) Date of Patent: Aug. 25, 2026

(54) AUDIO SIGNAL ENCODING METHOD, DECODING METHOD, ENCODING DEVICE, AND DECODING DEVICE

(71) Applicant: Huawei Technologies Co., Ltd., Shenzhen (CN)

(72) Inventors: Bingyin Xia, Beijing (CN); Jiawei Li, Beijing (CN); Zhe Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 285 days.

(21) Appl. No.: 17/965,979

(22) Filed: Oct. 14, 2022

(65) Prior Publication Data

US 2023/0048893 A1 Feb. 16, 2023

Related U.S. Application Data

(63) Continuation of application No. PCT/CN2021/085920, filed on Apr. 8, 2021.

(30) Foreign Application Priority Data

Apr. 15, 2020 (CN) ......................... 202010297340.0

(51) Int. Cl.

*G06F 17/00* (2019.01)
*G10L 19/008* (2013.01)

(Continued)

(52) U.S. Cl.

CPC ........ *G10L 19/0204* (2013.01); *G10L 19/008* (2013.01); *G10L 19/167* (2013.01); *G10L 19/22* (2013.01)

(58) Field of Classification Search

CPC . G10L 19/0204; G10L 19/008; G10L 19/167; G10L 19/22; G10L 19/04; G10L 19/20; G10L 21/038; G10L 25/18

(Continued)

(56) References Cited

U.S. PATENT DOCUMENTS 10,224,048 B2 3/2019 Kamano et al.
2006/0247922 A1 11/2006 Hetherington et al.

(Continued)

FOREIGN PATENT DOCUMENTS

CN 1950686 A 4/2007
CN 101164104 A 4/2008

(Continued)

OTHER PUBLICATIONS

Sang-Uk Ryu et al, Enhanced Accuracy of the Tonality Measure and Control Parameter Extraction Modules in MPEG-4 HE-AAC, Audio Engineering Society, Convention Paper 6586, Presented at the 119th Convention, Oct. 7-10, 2005, New York, NY, USA, 10 pages, XP040507430.

(Continued)

*Primary Examiner* — Paul C Mccord
(74) *Attorney, Agent, or Firm* — Conley Rose, P.C.

(57) ABSTRACT

An audio signal encoding method includes obtaining a current frame of an audio signal, where the current frame includes a high frequency band signal and a low frequency band signal; obtaining a parameter of bandwidth extension of the current frame based on the high frequency band signal, the low frequency band signal, and configuration information of the bandwidth extension; obtaining tile information, where the tile information indicates a first frequency range in which tonal component detection needs to be performed on the high frequency band signal; performing tonal component detection in the first frequency range to obtain information about a tonal component of the high frequency band signal; and performing bitstream multiplexing on the parameter of the bandwidth extension and the information of the tonal component to obtain a payload bitstream.

16 Claims, 9 Drawing Sheets

(51) Int. Cl.
*G10L 19/02* (2013.01)
*G10L 19/16* (2013.01)
*G10L 19/22* (2013.01)

(58) Field of Classification Search
USPC .......................................................... 704/500
See application file for complete search history.

(56) References Cited

U.S. PATENT DOCUMENTS

2009/0006103 A1* 1/2009 Koishida ............... G10L 19/008 704/500
2010/0292994 A1 11/2010 Lee et al.
2014/0310819 A1* 10/2014 Cakarel .............. H04N 21/4335 726/26
2015/0162010 A1* 6/2015 Ishikawa ................. G10L 19/00 704/500
2015/0287417 A1 10/2015 Disch et al.
2016/0213803 A1* 7/2016 Lunman .................... A61L 9/20
2017/0092282 A1 3/2017 Choo

FOREIGN PATENT DOCUMENTS

| | | | |
|---|---|---|---|
| CN | 101903944 | A | 12/2010 |
| CN | 104584124 | A | 4/2015 |
| CN | 105280190 | A | 1/2016 |
| CN | 105453175 | A | 3/2016 |
| CN | 106463143 | A | 2/2017 |
| EP | 3576088 | A1 | 12/2019 |

OTHER PUBLICATIONS

Frederik Nagel et al, A Continuous Modulated Single Sideband Bandwidth Extension, 2010 IEEE, 4 pages, XP031697766.
Chong Kok Seng et al., Low Power Spectral Band Replication Technology for the MPEG-4 Audio Standard, ICICS—PCM 2003, Dec. 15-18, 2003, 5 pages.

* cited by examiner

AUDIO SIGNAL ENCODING METHOD, DECODING METHOD, ENCODING DEVICE, AND DECODING DEVICE

CROSS-REFERENCE TO RELATED APPLICATIONS

This is a continuation of International Patent Application No. PCT/CN2021/085920 filed on Apr. 8, 2021, which claims priority to Chinese Patent Application No. 202010297340.0 filed on Apr. 15, 2020. The disclosures of the aforementioned applications are hereby incorporated by reference in their entireties.

TECHNICAL FIELD

This disclosure relates to the communication field, and in particular, to an audio signal encoding method, a decoding method, an encoding device, and a decoding device.

BACKGROUND

With the progress of society and the continuous development of technologies, users have increasingly high requirements for audio services. How to provide a service of higher quality for a user in a case of a limited coding bit rate, or how to provide a service of same quality for a user by using a lower coding bit rate has always been a focus of audio encoding and decoding research.

Generally, in a process of coding audio data, a high frequency part and a low frequency part in the audio data are separately processed. To reduce a coding bit rate, correlation between signals in different frequency bands is usually further used for coding. For example, a high frequency band signal is generated based on a low frequency band signal and by using a method such as spectral band replication or bandwidth extension. However, some tonal components that are dissimilar to tonal components in a spectrum of a low frequency band usually exist in a spectrum of a high frequency band, and an existing solution cannot process these dissimilar tonal components. Consequently, coding quality of actual coded data is low. Therefore, how to obtain high-quality coded data becomes a problem to be urgently resolved.

SUMMARY

This disclosure provides an audio signal encoding method, a decoding method, an encoding device, and a decoding device, to implement higher-quality audio encoding and decoding and improve user experience.

According to a first aspect, this disclosure provides an audio signal encoding method. The method includes obtaining a current frame of an audio signal, where the current frame includes a high frequency band signal and a low frequency band signal, obtaining a parameter of bandwidth extension of the current frame based on the high frequency band signal, the low frequency band signal, and preset configuration information of the bandwidth extension, obtaining tile information, where the tile information indicates a first frequency range in which tonal component detection needs to be performed on the high frequency band signal, performing tonal component detection in the first frequency range to obtain information about a tonal component of the high frequency band signal, and performing bitstream multiplexing on the parameter of the bandwidth extension and the information about the tonal component to obtain a payload bitstream.

Therefore, in this implementation of this disclosure, tonal component detection may be performed based on a frequency range indicated by the tile information, where the frequency range is determined based on the configuration information of the bandwidth extension and a sampling frequency of the audio signal, so that the information about the tonal component obtained through detection can cover more frequency ranges in which tonal components are dissimilar between the high frequency band signal and the low frequency band signal, and encoding is performed based on information about tonal components covering more frequency ranges. This improves encoding quality.

In a possible implementation, the method provided in the first aspect may further include performing bitstream multiplexing on the tile information to obtain a configuration bitstream. Therefore, in this implementation of this disclosure, the tile information may be sent to a decoding device by using the configuration bitstream, so that the decoding device can perform decoding based on the frequency range indicated by the tile information included in the configuration bitstream. In this way, information about a dissimilar tonal component between the high frequency band signal and the low frequency band signal can be decoded. This further improves decoding quality.

In a possible implementation, obtaining tile information may include: determining the tile information based on the sampling frequency of the audio signal and the configuration information. In this implementation of this disclosure, the audio signal has one or more frames, and corresponding tile information may be determined when each frame is encoded, or a plurality of frames may use same tile information. A plurality of implementations are provided, and may be further adjusted based on an actual application scenario.

In a possible implementation, the tile information may include at least one of the following: a first quantity, identification information, relationship information, or a quantity of changed tiles, where the first quantity is a quantity of tiles in the first frequency range, the identification information indicates whether the first frequency range is the same as a second frequency range corresponding to the bandwidth extension indicated by the configuration information, the relationship information indicates a value relationship between the first frequency range and the second frequency range when the first frequency range is different from the second frequency range, and the quantity of changed tiles is a quantity of tiles in which there is a difference between the first frequency range and the second frequency range when the first frequency range is different from the second frequency range. Therefore, the frequency range in which tonal component detection needs to be performed may be accurately determined based on the tile information.

In a possible implementation, the configuration information of the bandwidth extension includes a bandwidth extension upper limit and/or a second quantity, and the second quantity is a quantity of tiles in the second frequency range. The method may further include determining the first quantity based on one or more of an encoding rate of the current frame, a quantity of channels of the audio signal, the sampling frequency of the audio signal, the bandwidth extension upper limit, or the second quantity. Therefore, in this implementation of this disclosure, a quantity of tiles in which tonal component detection needs to be performed may be accurately determined based on one or more of the encoding rate of the current frame, the quantity of channels of the audio signal, the sampling frequency, the bandwidth extension upper limit, or the second quantity.

In a possible implementation, the bandwidth extension upper limit includes one or more of the following: a highest frequency, a highest bin index, a highest frequency band index, or a highest tile index in the second frequency range.

In a possible implementation, there is at least one channel of the audio signal, and determining the first quantity based on one or more of an encoding rate of the current frame, a quantity of channels of the audio signal, the sampling frequency, the bandwidth extension upper limit, or the second quantity may include determining a first determining identifier of a current channel in the current frame based on the encoding rate of the current frame and the quantity of channels, where the encoding rate of the current frame is an encoding rate of all channels in the current frame, and determining a first quantity of current channels based on the first determining identifier in combination with the second quantity, or determining a second determining identifier of a current channel in the current frame based on the sampling frequency and the bandwidth extension upper limit, and determining a first quantity of current channels based on the second determining identifier in combination with the second quantity, or determining a first determining identifier of a current channel in the current frame based on the encoding rate of the current frame and the quantity of channels, and determining a second determining identifier of the current channel in the current frame based on the sampling frequency and the bandwidth extension upper limit, and determining a first quantity of current channels in the current frame based on the first determining identifier and the second determining identifier in combination with the second quantity.

Therefore, in this implementation of this disclosure, the first quantity may be determined in a plurality of manners in combination with the second quantity, to accurately determine the quantity of tiles in which tonal component detection needs to be performed.

In a possible implementation, determining a first determining identifier of a current channel in the current frame based on the encoding rate of the current frame and the quantity of channels may include obtaining an average encoding rate of each channel in the current frame based on the encoding rate of the current frame and the quantity of channels, and obtaining the first determining identifier of the current channel based on the average encoding rate and a first threshold.

In this implementation of this disclosure, the first determining identifier of the current channel may be obtained based on the average encoding rate, so that the first determining identifier indicates whether the average encoding rate is greater than the first threshold. In this way, a first quantity subsequently obtained is more accurate.

In a possible implementation, determining a first determining identifier of a current channel in the current frame based on the encoding rate of the current frame and the quantity of channels may further include determining an actual encoding rate of the current channel based on the encoding rate of the current frame and the quantity of channels, and obtaining the first determining identifier of the current channel based on the actual encoding rate of the current channel and a second threshold.

In this implementation of this disclosure, an actual encoding rate may be allocated to each channel, so that the first determining identifier indicates whether the actual encoding rate of the current channel is greater than the second threshold. In this way, a first quantity subsequently obtained is more accurate.

In a possible implementation, determining a second determining identifier of a current channel in the current frame based on the sampling frequency and the bandwidth extension upper limit may include, when the bandwidth extension upper limit includes the highest frequency, comparing whether the highest frequency included in the bandwidth extension upper limit is the same as a highest frequency of the audio signal, to determine the second determining identifier of the current channel in the current frame, or when the bandwidth extension upper limit includes the highest frequency band index, comparing whether the highest frequency band index included in the bandwidth extension upper limit is the same as a highest frequency band index of the audio signal, to determine the second determining identifier of the current channel in the current frame, where the highest frequency band index of the audio signal is determined based on the sampling frequency.

In this implementation of this disclosure, the second determining identifier may be determined by comparing the highest frequency included in the bandwidth extension upper limit with the highest frequency of the audio signal, or by comparing a highest bin index, the highest frequency band index, a highest tile index, or the like included in the bandwidth extension upper limit with a highest bin index, the highest frequency band index, a highest tile index, or the like corresponding to the audio signal, to determine whether the highest frequency of the audio signal exceeds a frequency upper limit of the bandwidth extension, so as to obtain a more accurate first quantity.

In a possible implementation, determining a first quantity of current channels in the current frame may include, if both the first determining identifier and the second determining identifier meet a preset condition, adding one or more tiles to the second quantity corresponding to the bandwidth extension to obtain the first quantity of current channels, or if the first determining identifier or the second determining identifier does not meet the preset condition, using the second quantity corresponding to the bandwidth extension as the first quantity of current channels.

Therefore, in this implementation of this disclosure, when both the first determining identifier and the second determining identifier meet the preset condition, it indicates that the frequency range in which tonal component detection needs to be performed exceeds the frequency range corresponding to the bandwidth extension, and a quantity of tiles needs to be increased, so that the quantity of tiles in which tonal component detection is performed can cover the frequency range corresponding to the bandwidth extension. In this way, finally obtained information about tonal components can cover information about all tonal components in the current frame of the tonal signal. This improves the encoding quality. When the first determining identifier or the second determining identifier does not meet the preset condition, tone component detection may be performed in the frequency range corresponding to the bandwidth extension in the current frame, or information about all tonal components in the current frame may be completely covered. This improves the encoding quality.

In a possible implementation, a lower limit of the first frequency range is the same as a lower limit of the second frequency range in which the bandwidth extension indicated by the configuration information is performed. When the first quantity included in the tile information is less than or equal to the second quantity corresponding to the bandwidth extension, distribution of the tile in the first frequency range is the same as distribution of the tile in the second frequency range indicated in the configuration information. When the first quantity is greater than the second quantity, a frequency upper limit of the first frequency range is greater than a frequency upper limit of the second frequency range, distribution of a tile in an overlapping part of the first frequency range and the second frequency range is the same as distribution of the tile in the second frequency range, and distribution of a tile in a non-overlapping part of the first frequency range and the second frequency range is determined in a preset manner.

Therefore, in this implementation of this disclosure, the lower limit of the first frequency range is the same as the lower limit of the second frequency range in which the bandwidth extension is performed. Subsequently, a division manner of the tile in the first frequency range may be determined by comparing the quantity of tiles in the first frequency range with the quantity of tiles in the second frequency range, to accurately determine the tiles included in the first frequency range.

In a possible implementation, the tile in the non-overlapping part of the first frequency range and the second frequency range meets the following conditions: a width of the tile in the non-overlapping part of the first frequency range and the second frequency range is less than or equal to a preset value, and a frequency upper limit of the tile in the non-overlapping part of the first frequency range and the second frequency range is less than or equal to the highest frequency of the audio signal. Therefore, in this implementation of this disclosure, a manner of dividing the non-overlapping part of the first frequency range and the second frequency range may be limited, in other words, the width does not exceed the preset value, and the frequency upper limit of the tile is less than or equal to the highest frequency of the audio signal, so that more proper division into the tiles can be implemented.

In a possible implementation, in this implementation of this disclosure, the frequency range is divided. The first frequency range may be divided into one or more tiles, and each tile may be further divided into one or more frequency bands. In addition, frequency bands in the frequency range may be sorted, and each frequency band has a different index, so that values of frequencies may be compared by comparing indexes of the frequency bands.

In a possible implementation, the quantity of tiles in the first frequency range is a preset quantity. Therefore, in this implementation of this disclosure, the quantity of tiles in which tonal component detection needs to be performed may alternatively be set to the preset quantity, so that a workload can be directly reduced.

Optionally, when the quantity of tiles in the first frequency range is the preset quantity, the preset quantity may be written into the configuration bitstream, or may not be written into the configuration bitstream.

In a possible implementation, the information about the tonal component may include a position quantity parameter of the tonal component, and an amplitude parameter or an energy parameter of the tonal component.

In a possible implementation, the information about the tonal component may further include a noise floor parameter of the high frequency band signal.

According to a second aspect, this disclosure provides a decoding method, including obtaining a payload bitstream, performing bitstream demultiplexing on the payload bitstream to obtain a parameter of bandwidth extension and information about a tonal component of a current frame of an audio signal, obtaining a high frequency band signal of the current frame based on the parameter of the bandwidth extension, performing reconstruction based on the information about the tonal component and tile information to obtain a reconstructed tonal signal, where the tile information indicates a first frequency range in which tonal component reconstruction needs to be performed in the current frame, and obtaining a decoded signal of the current frame based on the high frequency band signal and the reconstructed tonal signal.

In this implementation of this disclosure, a frequency range in which tonal component reconstruction needs to be performed may be determined based on the tile information, where the frequency range is determined based on configuration information of the bandwidth extension and a sampling frequency of the audio signal, so that tonal component reconstruction can be performed on a dissimilar tonal component between the high frequency band signal and a low frequency band signal based on the tile information. This improves decoding quality.

In a possible implementation, the method may further include obtaining a configuration bitstream, and obtaining the tile information based on the configuration bitstream. Therefore, in this implementation of this disclosure, decoding may be performed based on the frequency range indicated by the tile information included in the configuration bitstream, so that information about the dissimilar tonal component between the high frequency band signal and the low frequency band signal can be decoded. This improves the decoding quality.

In a possible implementation, the tile information may include at least one of the following: a first quantity, identification information, relationship information, or a quantity of changed tiles, where the first quantity is a quantity of tiles in the first frequency range, the identification information indicates whether the first frequency range is the same as a second frequency range corresponding to the bandwidth extension, the relationship information indicates a value relationship between the first frequency range and the second frequency range when the first frequency range is different from the second frequency range, and the quantity of changed tiles is a quantity of tiles in which there is a difference between the first frequency range and the second frequency range when the first frequency range is different from the second frequency range.

In a possible implementation, performing reconstruction based on the information about the tonal component and tile information to obtain a reconstructed tonal signal includes determining, based on the tile information, that a quantity of tiles in which tonal component reconstruction needs to be performed is the first quantity, determining, based on the first quantity, each tile in which tonal component reconstruction is performed in the first frequency range, and reconstructing, in the first frequency range, the tonal component based on the information about the tonal component to obtain the reconstructed tonal signal.

Therefore, in this implementation of this disclosure, tonal component reconstruction may be performed based on the frequency range indicated by the tile information, so that the information about the dissimilar tonal component between the high frequency band signal and the low frequency band signal can be decoded. This improves the decoding quality.

In a possible implementation, a lower limit of the first frequency range is the same as a lower limit of the second frequency range in which the bandwidth extension indicated by the configuration information is performed. Determining, based on the first quantity, each tile in which tonal component reconstruction is performed in the first frequency range may include, if the first quantity is less than or equal to a second quantity, determining distribution of the tile in the first frequency range based on distribution of a tile in the second frequency range, where the second quantity is a quantity of tiles in the second frequency range, and if the first quantity is greater than the second quantity, determining that a frequency upper limit of the first frequency range is greater than a frequency upper limit of the second frequency range, determining distribution of a tile in an overlapping part of the first frequency range and the second frequency range based on distribution of the tile in the second frequency range, and determining distribution of a tile in a non-overlapping part of the first frequency range and the second frequency range in a preset manner, to obtain distribution of the tile in the first frequency range. In this implementation of this disclosure, the lower limit of the first frequency range is the same as the lower limit of the second frequency range in which the bandwidth extension is performed. Subsequently, a division manner of the tile in the first frequency range may be determined by comparing the quantity of tiles in the first frequency range with the quantity of tiles in the second frequency range, to accurately determine the tiles included in the first frequency range.

In a possible implementation, the tile in the non-overlapping part of the first frequency range and the second frequency range meets the following conditions: a width of the tile in the non-overlapping part of the first frequency range and the second frequency range is less than or equal to a preset value, and a frequency upper limit of the tile in the non-overlapping part of the first frequency range and the second frequency range is less than or equal to a highest frequency of the audio signal. Therefore, in this implementation of this disclosure, a manner of dividing the non-overlapping part of the first frequency range and the second frequency range may be limited, in other words, the width does not exceed the preset value, and the frequency upper limit of the tile is less than or equal to the highest frequency of the audio signal, so that more proper division into the tiles can be implemented.

According to a third aspect, this disclosure provides an encoding device, including an audio obtaining module configured to obtain a current frame of an audio signal, where the current frame includes a high frequency band signal and a low frequency band signal, a parameter obtaining module configured to obtain a parameter of bandwidth extension of the current frame based on the high frequency band signal, the low frequency band signal, and preset configuration information of the bandwidth extension, a frequency obtaining module configured to obtain tile information, where the tile information indicates a first frequency range in which tonal component detection needs to be performed on the high frequency band signal, a tonal component encoding module configured to perform tonal component detection in the first frequency range to obtain information about a tonal component of the high frequency band signal, and a bitstream multiplexing module configured to perform bitstream multiplexing on the parameter of the bandwidth extension and the information about the tonal component to obtain a payload bitstream.

For beneficial effects generated by any one of the third aspect and the possible implementations of the third aspect, refer to the descriptions of any one of the first aspect and the possible implementations of the first aspect.

In a possible implementation, the encoding device may further include the bitstream multiplexing module is further configured to perform bitstream multiplexing on the tile information to obtain a configuration bitstream.

In a possible implementation, the frequency obtaining module is further configured to determine the tile information based on a sampling frequency of the audio signal and the configuration information of the bandwidth extension.

In a possible implementation, the tile information includes at least one of the following: a first quantity, identification information, relationship information, or a quantity of changed tiles, where the first quantity is a quantity of tiles in the first frequency range, the identification information indicates whether the first frequency range is the same as a second frequency range corresponding to the bandwidth extension, the relationship information indicates a value relationship between the first frequency range and the second frequency range when the first frequency range is different from the second frequency range, and the quantity of changed tiles is a quantity of tiles in which there is a difference between the first frequency range and the second frequency range when the first frequency range is different from the second frequency range.

In a possible implementation, the tile information includes at least the first quantity, the configuration information of the bandwidth extension includes a bandwidth extension upper limit and/or a second quantity, and the second quantity is a quantity of tiles in the second frequency range, and the frequency obtaining module is further configured to determine the first quantity based on one or more of an encoding rate of the current frame, a quantity of channels of the audio signal, the sampling frequency, the bandwidth extension upper limit, or the second quantity.

In a possible implementation, the bandwidth extension upper limit includes one or more of the following: a highest frequency, a highest bin index, a highest frequency band index, or a highest tile index in the second frequency range.

In a possible implementation, there is at least one channel of the audio signal, the frequency obtaining module is further configured to determine a first determining identifier of a current channel in the current frame based on the encoding rate of the current frame and the quantity of channels, where the encoding rate of the current frame is an encoding rate of all channels in the current frame, and determine a first quantity of current channels based on the first determining identifier in combination with the second quantity, or determine a second determining identifier of a current channel in the current frame based on the sampling frequency and the bandwidth extension upper limit, and determine a first quantity of current channels based on the second determining identifier in combination with the second quantity, or determine a first determining identifier of a current channel in the current frame based on the encoding rate of the current frame and the quantity of channels, and determine a second determining identifier of the current channel in the current frame based on the sampling frequency and the bandwidth extension upper limit, and determine a first quantity of current channels in the current frame based on the first determining identifier and the second determining identifier in combination with the second quantity.

In a possible implementation, the frequency obtaining module is further configured to obtain an average encoding rate of each channel in the current frame based on the encoding rate of the current frame and the quantity of channels, and obtain the first determining identifier of the current channel based on the average encoding rate and a first threshold.

In a possible implementation, the frequency obtaining module may be further configured to determine an actual encoding rate of the current channel based on the encoding rate of the current frame and the quantity of channels, and obtain the first determining identifier of the current channel based on the actual encoding rate of the current channel and a second threshold.

In a possible implementation, the frequency obtaining module may be further configured to, when the bandwidth extension upper limit includes the highest frequency, compare whether the highest frequency included in the bandwidth extension upper limit is the same as a highest frequency of the audio signal, to determine the second determining identifier of the current channel in the current frame, or when the bandwidth extension upper limit includes the highest frequency band index, compare whether the highest frequency band index included in the bandwidth extension upper limit is the same as a highest frequency band index of the audio signal, to determine the second determining identifier of the current channel in the current frame, where the highest frequency band index of the audio signal is determined based on the sampling frequency.

In a possible implementation, the frequency obtaining module may be further configured to, if both the first determining identifier and the second determining identifier meet a preset condition, add one or more tiles to the second quantity corresponding to the bandwidth extension to obtain the first quantity of current channels, or if the first determining identifier or the second determining identifier does not meet the preset condition, use the second quantity corresponding to the bandwidth extension as the first quantity of current channels.

In a possible implementation, a lower limit of the first frequency range is the same as a lower limit of the second frequency range in which the bandwidth extension indicated by the configuration information is performed. When the first quantity included in the tile information is less than or equal to the second quantity corresponding to the bandwidth extension, distribution of the tile in the first frequency range is the same as distribution of the tile in the second frequency range. When the first quantity is greater than the second quantity, a frequency upper limit of the first frequency range is greater than a frequency upper limit of the second frequency range, distribution of a tile in an overlapping part of the first frequency range and the second frequency range is the same as distribution of the tile in the second frequency range, and distribution of a tile in a non-overlapping part of the first frequency range and the second frequency range is determined in a preset manner.

In a possible implementation, a width of the tile in the non-overlapping part of the first frequency range and the second frequency range is less than a preset value, and a frequency upper limit of the tile in the non-overlapping part of the first frequency range and the second frequency range is less than or equal to the highest frequency of the audio signal.

In a possible implementation, a frequency range corresponding to the high frequency band signal includes at least one tile, and one tile includes at least one frequency band.

In a possible implementation, the quantity of tiles in the first frequency range is a preset quantity.

In a possible implementation, the information about the tonal component includes a position quantity parameter of the tonal component, and an amplitude parameter or an energy parameter of the tonal component.

In a possible implementation, the information about the tonal component further includes a noise floor parameter of the high frequency band signal.

According to a fourth aspect, this disclosure provides a decoding device, including an obtaining module configured to obtain a payload bitstream, a demultiplexing module configured to perform bitstream demultiplexing on the payload bitstream to obtain a parameter of bandwidth extension and information about a tonal component of a current frame of an audio signal, a bandwidth extension decoding module configured to obtain a high frequency band signal of the current frame based on the parameter of the bandwidth extension, a reconstruction module configured to perform reconstruction based on the information about the tonal component and tile information to obtain a reconstructed tonal signal, where the tile information indicates a first frequency range in which tonal component reconstruction needs to be performed in the current frame, and a signal decoding module configured to obtain a decoded signal of the current frame based on the high frequency band signal and the reconstructed tonal signal.

For beneficial effects generated by any one of the fourth aspect and the possible implementations of the fourth aspect, refer to the descriptions of any one of the second aspect and the possible implementations of the second aspect.

In a possible implementation, the obtaining module may be further configured to obtain a configuration bitstream, and obtain the tile information based on the configuration bitstream.

In a possible implementation, the tile information includes at least one of the following: a first quantity, identification information, relationship information, or a quantity of changed tiles, where the first quantity is a quantity of tiles in the first frequency range, the identification information indicates whether the first frequency range is the same as a second frequency range corresponding to the bandwidth extension, the relationship information indicates a value relationship between the first frequency range and the second frequency range when the first frequency range is different from the second frequency range, and the quantity of changed tiles is a quantity of tiles in which there is a difference between the first frequency range and the second frequency range when the first frequency range is different from the second frequency range.

In a possible implementation, the reconstruction module may be further configured to determine, based on the tile information, that a quantity of tiles in which tonal component reconstruction needs to be performed is the first quantity, determine, based on the first quantity, each tile in which tonal component reconstruction is performed in the first frequency range, and reconstruct, in the first frequency range, the tonal component based on the information about the tonal component to obtain the reconstructed tonal signal.

In a possible implementation, a lower limit of the first frequency range is the same as a lower limit of the second frequency range in which the bandwidth extension indicated by configuration information is performed. The obtaining module may be further configured to, if the first quantity is less than or equal to a second quantity, determine a tile in an overlapping part of the first frequency range and the second frequency range based on distribution of a tile in the second frequency range, where the second quantity is a quantity of tiles in the second frequency range, and if the first quantity is greater than the second quantity, determine that a frequency upper limit of the first frequency range is greater than a frequency upper limit of the second frequency range, determine distribution of the tile in the overlapping part of the first frequency range and the second frequency range based on distribution of the tile in the second frequency range, and determine distribution of a tile in a non-overlapping part of the first frequency range and the second frequency range in a preset manner, to obtain distribution of the tile in the first frequency range.

In a possible implementation, the tile divided in the non-overlapping part of the first frequency range and the second frequency range meets the following conditions: a width of the tile divided in the non-overlapping part of the first frequency range and the second frequency range is less than a preset value, and a frequency upper limit of the tile divided in the non-overlapping part of the first frequency range and the second frequency range is less than or equal to a highest frequency of the audio signal.

In a possible implementation, the information about the tonal component includes a position quantity parameter of the tonal component, and an amplitude parameter or an energy parameter of the tonal component.

In a possible implementation, the information about the tonal component further includes a noise floor parameter of the high frequency band signal.

According to a fifth aspect, this disclosure provides an encoding device, including a processor and a memory. The processor and the memory are interconnected through a line, and the processor invokes program code in the memory to perform a processing-related function in the audio signal encoding method according to any one of the first aspect.

According to a sixth aspect, this disclosure provides a decoding device, including a processor and a memory. The processor and the memory are interconnected through a line, and the processor invokes program code in the memory to perform a processing-related function in the decoding method according to any one of the second aspect.

According to a seventh aspect, this disclosure provides a communication system, including an encoding device and a decoding device. The encoding device is configured to perform the audio signal encoding method according to any one of the first aspect, and the decoding device is configured to perform the decoding method according to any one of the second aspect.

According to an eighth aspect, an embodiment of this disclosure provides a digital processing chip, where chip includes a processor and a memory. The memory and the processor are interconnected through a line, the memory stores instructions, and the processor is configured to perform a processing-related function in any one of the first aspect or the optional implementations of the first aspect, or any one of the second aspect or the optional implementations of the second aspect.

According to a ninth aspect, an embodiment of this disclosure provides a computer-readable storage medium, including instructions. When the instructions are run on a computer, the computer is enabled to perform the method in any one of the first aspect or the optional implementations of the first aspect, or any one of the second aspect or the optional implementations of the second aspect.

According to a tenth aspect, an embodiment of this disclosure provides a computer program product including instructions. When the computer program product runs on a computer, the computer is enabled to perform the method in any one of the first aspect or the optional implementations of the first aspect, or any one of the second aspect or the optional implementations of the second aspect.

According to an eleventh aspect, this disclosure provides a network device. The network device may be used in a device such as an encoding device or a decoding device. The network device is coupled to a memory, to read and execute instructions stored in the memory, so that the network device implements steps of the method provided in any implementation of any one of the first aspect and the second aspect of this disclosure. In a possible design, the network device is a chip or a system on chip.

According to a twelfth aspect, this disclosure provides a computer-readable storage medium, storing a payload bitstream generated according to the method provided in any implementation of any one of the first aspect and the second aspect of this disclosure.

According to a thirteenth aspect, this disclosure provides a computer program stored in a computer-readable storage medium. The computer program includes instructions, and when the instructions are executed, the method provided in any implementation of any one of the first aspect and the second aspect of this disclosure is implemented.

DESCRIPTION OF EMBODIMENTS

This disclosure provides an audio signal encoding method, a decoding method, an encoding device, and a decoding device, to implement higher-quality audio encoding and decoding and improve user experience.

First, the audio signal encoding method and the decoding method provided in this disclosure may be applied to various systems in which data transmission exists.

Figure 1:
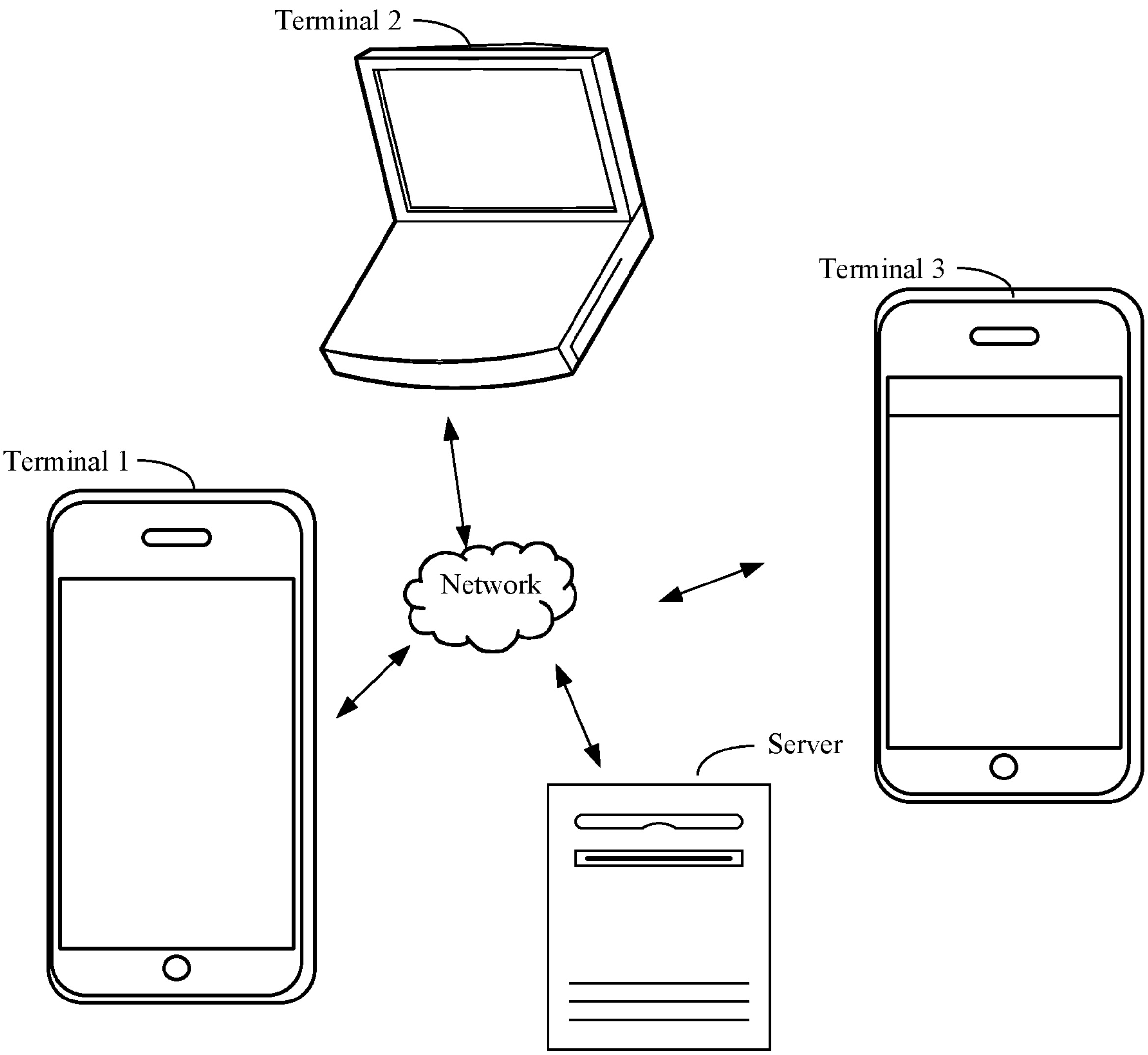
FIG. 1 is a schematic diagram of an architecture of a communication system according to this disclosure.

For example, FIG. 1 is a schematic diagram of an architecture of a communication system according to this disclosure.

The communication system may include a plurality of devices such as a terminal or a server, and the plurality of devices may be connected by using a network.

The network may be a wired communication network, or may be a wireless communication network. For example, the network may be a 5th generation mobile communication technology (5G) system, a Long-Term Evolution (LTE) system, a Global System for Mobile Communication (GSM), a code-division multiple access (CDMA) network, or a wideband CDMA (WCDMA) network. The network may alternatively be another communication network or communication system, for example, WI-FI or a wide area network.

There may be one or more terminals, for example, a terminal 1, a terminal 2, or a terminal 3 shown in FIG. 1. Further, the terminal in the communication system may include a head-mounted display (TIMID) device. The head-mounted display device may be a combination of a virtual reality (VR) box and a terminal, an all-in-one VR machine, personal computer (PC), VR, an augmented reality (AR) device, a mixed reality (MR) device, or the like. The terminal may further include a cellular phone, a smartphone, a personal digital assistant (PDA), a tablet computer, a laptop computer, a PC, or a computing device deployed on a user side.

There may be one or more servers. When there is a plurality of servers in the communication system, the plurality of servers may be distributed servers, or may be centralized servers. This may be further adjusted based on an actual application scenario. This is not limited in this disclosure.

Further, the terminal, the server, or the like may be used as an encoding device, or may be used as a decoding device. It may be understood that the terminal or the server may perform the audio signal encoding method provided in this disclosure, or may perform the decoding method provided in this disclosure. Certainly, the encoding device and the decoding device may alternatively be devices independent of each other. For example, one terminal may be used as an encoding device, and another terminal may be used as a decoding device.

Figure 2:
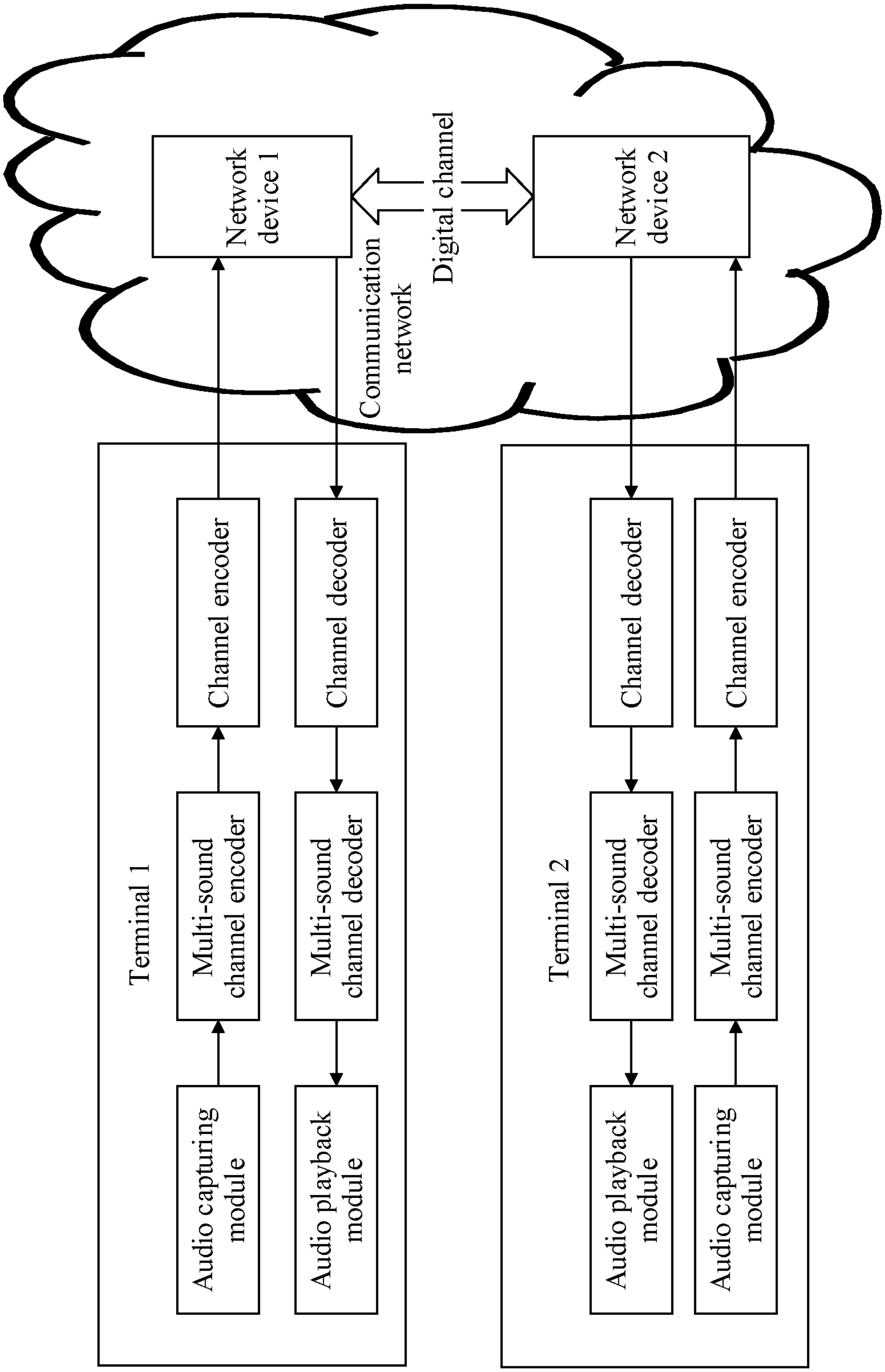
FIG. 2 is a schematic diagram of a structure of another communication system according to this disclosure.

More further, refer to FIG. 2. The following uses two terminals as an example to describe in more detail the communication system provided in this disclosure.

A terminal 1 and a terminal 2 each may include an audio capturing module, a multi-channel encoder, a channel encoder, a channel decoder, a multi-channel decoder, and an audio playback module.

The following briefly describes an example in which the terminal 1 performs the audio signal encoding method and the terminal 2 performs the decoding method. For specific executed steps, refer to the following description in FIG. 4 or FIG. 5.

The audio capturing module of the terminal 1 may obtain an audio signal. The audio capturing module may include a device such as a sensor, a microphone, a camera, or a recorder, or the audio capturing module may directly receive an audio signal sent by another device.

If the audio signal is a multi-channel signal, the multi-channel encoder encodes the audio signal. Then, the channel encoder encodes a signal obtained by encoding by the multi-channel encoder to obtain an encoded bitstream.

Then, the encoded bitstream is transmitted to a network device 1 in a communication network. The network device 1 transmits the encoded bitstream to a network device 2 through a digital channel, and then the network device 2 transmits the encoded bitstream to the terminal 2. The network device 1 or the network device 2 may be a forwarding device in the communication network, for example, a device such as a router or a switch.

After receiving the encoded bitstream, the terminal 2 performs channel decoding on the encoded bitstream by using the channel decoder to obtain a signal obtained after channel decoding.

Then, the multi-channel decoder performs multi-channel decoding on the signal obtained after channel decoding to obtain the audio signal. The audio playback module may play the audio signal. The audio playback module may include a device such as a speaker or a headset.

In addition, the audio capturing module of the terminal 2 may alternatively capture an audio signal. An encoded bitstream is obtained by using the multi-channel encoder and the channel encoder, and the encoded bitstream is sent to the terminal 1 by using the communication network. Then, the channel decoder and the multi-channel decoder of the terminal 1 perform decoding to obtain the audio signal, and the audio playback module of the terminal 1 plays audio.

Figure 3:
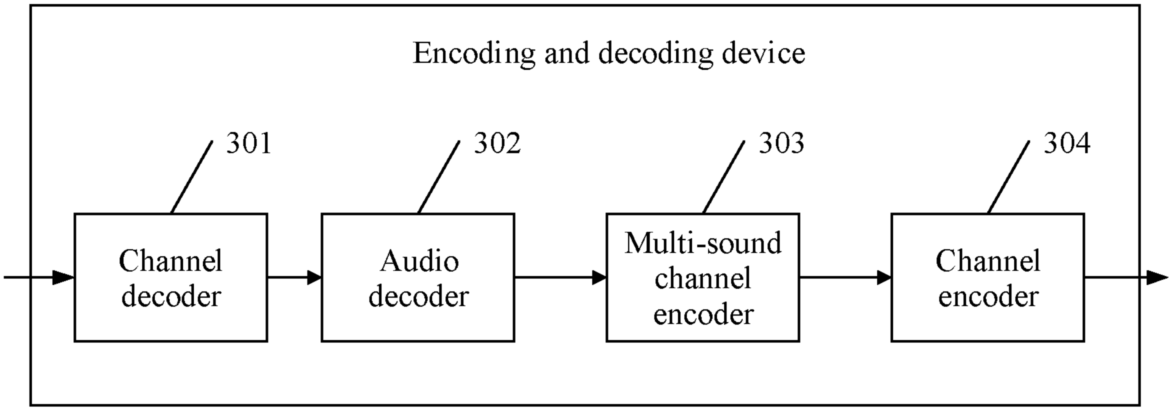
FIG. 3 is a schematic diagram of a structure of an encoding and decoding device according to this disclosure.

In another scenario, the encoding device in the communication system may be a forwarding device that does not have audio capturing and audio playback functions. For example, FIG. 3 is a schematic diagram of a structure an encoding and decoding device according to this disclosure. The encoding device may include a channel decoder 301, an audio decoder 302, a multi-channel encoder 303, and a channel encoder 304. When an encoded bitstream is received, the channel decoder 301 may perform channel decoding on the encoded bitstream to obtain a channel decoded signal. Then, the audio decoder 302 performs audio decoding on the channel decoded signal to obtain an audio signal. Then, the multi-channel encoder 303 performs multi-channel encoding on the audio signal to obtain a multi-channel encoded signal. Finally, the channel encoder 304 performs channel encoding on the multi-channel encoded signal to obtain an updated encoded bitstream, and sends the updated encoded bitstream to another device to complete forwarding of the encoded bitstream.

Figure 4:
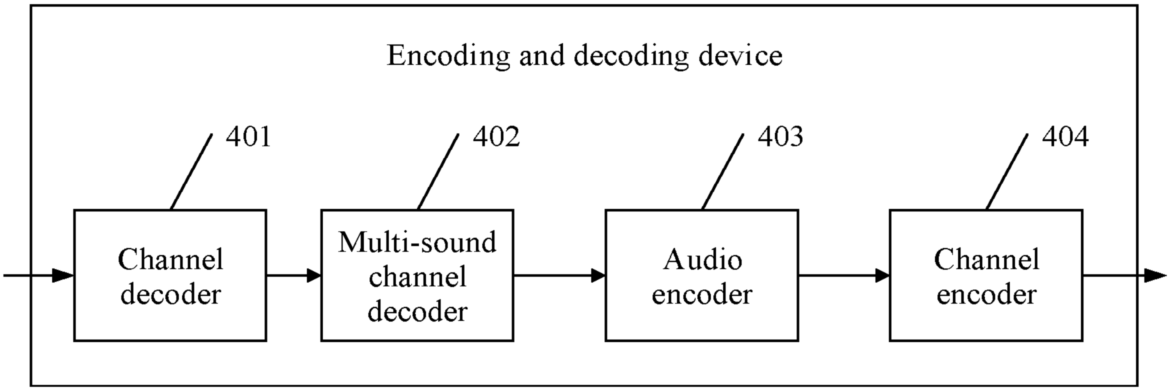
FIG. 4 is a schematic diagram of a structure of another encoding and decoding device according to this disclosure.

In different scenarios, types of used encoders and decoders may also be different. For example, as shown in FIG. 4, after an encoded bitstream is received and a channel decoder 401 decodes the encoded bitstream to obtain a channel decoded signal, a multi-channel decoder 402 performs multi-channel decoding on the channel decoded signal to restore an audio signal. Then, an audio encoder 403 encodes the audio signal, and a channel encoder 404 performs channel encoding on data encoded by the audio encoder 403 to obtain an updated encoded bitstream.

In addition, a scenario of a multi-channel audio signal is described above. The multi-channel audio signal may alternatively be a stereo signal, a dual-channel signal, or the like. The stereo signal is used as an example. The multi-channel audio signal may alternatively be the stereo signal, the multi-channel encoder may alternatively be a stereo encoder, or the multi-channel decoder may alternatively be a stereo decoder.

The following describes an audio signal encoding process by using a specific scenario as an example. Three-dimensional audio has become a new trend of audio service development because it can bring better immersive experience to a user. The three-dimensional audio may be understood as audio including a plurality of sound channels. To implement a three-dimensional audio service, an original audio signal format that needs to be compressed and encoded may be classified into: a sound channel-based audio signal format, an object-based audio signal format, a scene-based audio signal format, and a hybrid signal format of any three audio signal formats. For audio signals in the foregoing formats, the audio signals that need to be compressed and encoded by an audio encoder include a plurality of channels of signals, and the plurality of channels of signals may also be understood as a plurality of channels. Generally, the audio encoder downmixes the plurality of channels of signals based on correlation between channels to obtain a downmixed signal and a multi-channel encoding parameter. Generally, a quantity of channels included in the downmixed signal is far less than a quantity of channels of an input audio signal. For example, a multi-channel signal may be downmixed into a stereo signal. Then, the downmixed signal is encoded. The stereo signal may be further downmixed into a monophonic signal and a stereo encoding parameter, and a downmixed monophonic signal is encoded. A quantity of bits used for encoding the downmixed signal and the multi-channel encoding parameter is far less than that for independently encoding an input multi-channel signal. Therefore, a workload of the encoder and a data volume of an encoded bitstream obtained after encoding can be reduced, and transmission efficiency can be improved.

In addition, to reduce a coding bit rate, correlation between signals in different frequency bands is usually further used for coding. An encoding device encodes a low frequency band signal and correlation data between the low frequency band signal and a high frequency band signal, to encode the high frequency band signal by using a relatively small quantity of bits, thereby reducing an encoding bit rate of the entire encoder. For example, in a coding process of an enhanced voice service (EVS) coder/decoder or a Moving Picture Experts Group (MPEG) coder/decoder in a 3rd Generation Partnership Project (3GPP), the correlation between signals in different frequency bands is used, and a bandwidth extension technology or a spectral band replication technology is used to code the high frequency band signal. However, in an actual audio signal, some tonal components that are dissimilar to tonal components in a spectrum of a low frequency band usually exist in a spectrum of a high frequency band. If the dissimilar tonal components are not coded or reconstructed, encoding and decoding quality of audio and video may be poor.

Therefore, this disclosure provides an audio signal encoding method and a decoding method, to improve encoding and decoding quality of an audio signal. Even in a scenario in which a tonal component that is dissimilar to a tonal component in the spectrum of the low frequency band exists in the spectrum of the high frequency band, a high-quality encoded bitstream can be obtained. Therefore, a decoder side can obtain a high-quality audio signal through decoding. This improves user experience.

The following separately describes in detail the audio signal encoding method and the decoding method provided in this disclosure.

Figure 5:
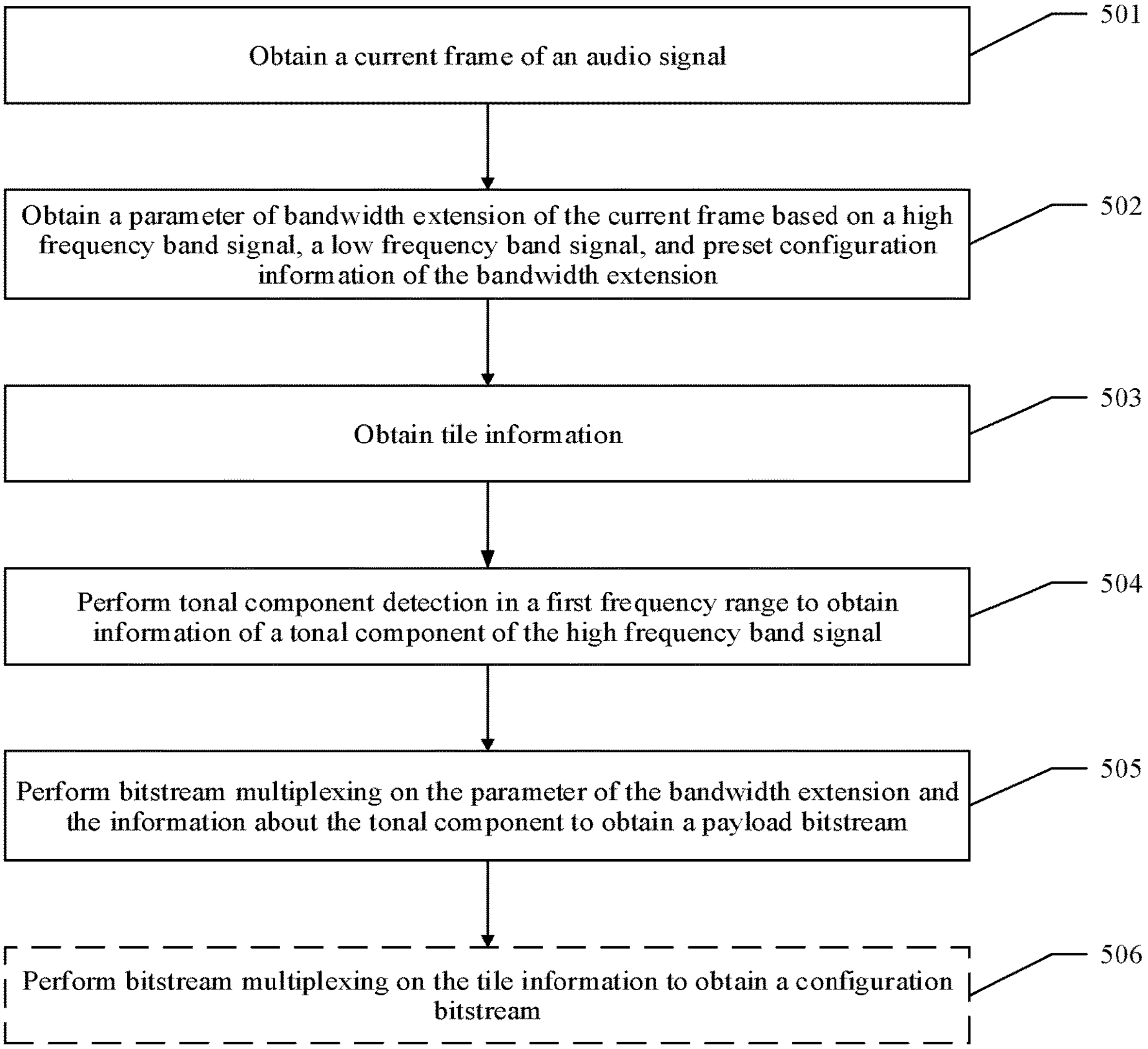
FIG. 5 is a schematic flowchart of an audio signal encoding method according to this disclosure.

First, the audio signal encoding method provided in this disclosure is described. FIG. 5 is a schematic flowchart of an audio signal encoding method according to this disclosure. Details are as follows.

501: Obtain a current frame of an audio signal.

The current frame may be any frame in the audio signal, the current frame may include a high frequency band signal and a low frequency band signal, and a frequency of the high frequency band signal is higher than a frequency of the low frequency band signal. Division into the high frequency band signal and the low frequency band signal may be determined by using a frequency band threshold. A signal higher than the frequency band threshold is a high frequency band signal, and a signal lower than the frequency band threshold is a low frequency band signal. The frequency band threshold may be determined based on a transmission bandwidth and a processing capability of an encoder or a decoder. This is not limited in this disclosure.

The high frequency band signal and the low frequency band signal are relative. For example, a signal lower than a frequency (namely, the frequency band threshold) is a low frequency band signal, and a signal higher than the frequency is a high frequency band signal (the signal corresponding to the frequency may be classified into the low frequency band signal or the high frequency band signal). The frequency varies with bandwidths of the current frame. For example, when the current frame is a wideband signal of 0 kilohertz (kHz) to 8 kHz, the frequency may be 4 kHz, and when the current frame is an ultra-wideband signal of 0 kHz to 16 kHz, the frequency may be 8 kHz.

It should be noted that the audio signal in this embodiment of this disclosure may include a plurality of frames. For example, the current frame may further refer to a frame in the audio signal. In this embodiment of this disclosure, encoding and decoding of the current frame of the audio signal are used as an example for description. A previous frame or a next frame of the current frame in the audio signal may be correspondingly encoded and decoded based on encoding and decoding manners of the current frame of the audio signal. An encoding process and a decoding process of the previous frame or the next frame of the current frame in the audio signal are not described one by one. In addition, the audio signal in this embodiment of this disclosure may be a monophonic audio signal, or may be a stereo signal (or may be a multi-channel signal). The stereo signal may be an original stereo signal, may be a stereo signal including two channels of signals (a left sound channel signal and a right sound channel signal) included in a multi-channel signal, or may be a stereo signal including two channels of signals generated by at least three channels of signals included in a multi-channel signal. This is not limited in this embodiment of this disclosure.

It should be further noted that in this implementation of this disclosure, the audio signal may be a multi-channel signal, or may be a single-channel signal. When the audio signal is a multi-channel signal, a signal of each channel may be encoded. In this implementation of this disclosure, only an encoding process of a signal of one channel (referred to as a current channel below) is used as an example for description. In actual application, the following steps 502 to 506 may be performed for each channel in the audio signal. Repeated steps are not described again in this disclosure. It should be understood that the sound channel in this disclosure may alternatively be replaced with a channel. For example, the foregoing multi-channel may alternatively be replaced with a multi-channel. For ease of understanding, the multi-channel is referred to as a channel in the following implementations.

502: Obtain a parameter of bandwidth extension of the current frame based on the high frequency band signal, the low frequency band signal, and preset configuration information of the bandwidth extension.

In a process of encoding the high frequency band signal and the low frequency band signal, a high frequency band may be divided into a plurality of tiles. The parameter of the bandwidth extension may be determined in a unit of a tile, that is, each tile has a parameter of the bandwidth extension.

Further, the parameter of the bandwidth extension may include different parameters in different scenarios. Further, a parameter further included in the parameter of the bandwidth extension may be determined based on an actual application scenario. For example, in a time domain bandwidth extension scenario, the parameter of the bandwidth extension may include a high frequency band linear predictive coding (LPC) parameter, a high frequency band gain, a filtering parameter, or the like. In a frequency domain bandwidth extension scenario, the parameter of the bandwidth extension may further include a parameter such as a time domain envelope or a frequency domain envelope.

The configuration information of the bandwidth extension may be pre-configured information, and may be further determined based on a data processing capability of the encoder or the decoder. In a possible implementation, the configuration information of the bandwidth extension may include a bandwidth extension upper limit, a second quantity, or the like. The second quantity is a quantity of tiles in which the bandwidth extension is performed. Further, a second frequency range corresponding to the bandwidth extension may be indicated by using the bandwidth extension upper limit or the second quantity. For example, a frequency lower limit of the second frequency range may be usually fixed, for example, the frequency band threshold in step 501. A frequency upper limit of the second frequency range may be indicated by using the bandwidth extension upper limit, so that the second frequency range may be determined based on the determined frequency lower limit and the determined frequency upper limit. For another example, if the configuration information includes the second quantity, the frequency lower limit of the second frequency range generally may be fixed, for example, the frequency band threshold in step 501. In this case, a boundary of a tile corresponding to the second frequency range may be queried by using a preset table, to determine the second frequency range.

Further, the bandwidth extension upper limit included in the configuration information of the bandwidth extension may include but is not limited to one or more of the following: a highest frequency, a highest bin index, a highest frequency band index, or a highest tile index in the second frequency range. The highest bin index in the second frequency range is an index of a bin in which the highest frequency is located in the second frequency range, the highest frequency band index is an index of a frequency band in which the highest frequency is located in the second frequency range, and the highest tile index is an index of a tile in which the highest frequency is located in the second frequency range. The highest bin index, the highest frequency band index, and the highest tile index may increase with an increase in a value of a frequency. For example, an index of a bin in which a lower frequency is located is less than an index of a bin in which a higher frequency is located, an index of a frequency band in which a lower frequency is located is less than an index of a frequency band in which a higher frequency is located, and an index of a tile in which a lower frequency is located is less than an index of a tile in which a higher frequency is located. It should be noted that numbers of bins, frequency bands, or tiles may be numbered according to a preset sequence, or a fixed number may be allocated to each bin, frequency band, or tile. This may be further adjusted based on an actual application scenario. This is not limited in this disclosure.

In addition, based on the high frequency band signal, the low frequency band signal, and the configuration information of the bandwidth extension, in addition to the parameter of the bandwidth extension of the current frame, an encoding parameter of the high frequency band signal or the low frequency band signal may be obtained. For example, a time domain noise shaping parameter, a frequency domain noise shaping parameter, or a spectral quantization parameter of the high frequency band signal or the low frequency band signal may be obtained. The time domain noise shaping parameter and the frequency domain noise shaping parameter are used to preprocess a to-be-encoded spectral coefficient. This improves quantization encoding efficiency of the spectral coefficient. The spectral quantization parameter is a quantized spectral coefficient, a corresponding gain parameter, and the like.

503: Obtain tile information.

The tile information indicates a first frequency range of the high frequency band signal of the current frame.

In this implementation of this disclosure, a frequency range in which tonal component detection needs to be performed is referred to as the first frequency range, a frequency range corresponding to the bandwidth extension indicated by the configuration information is referred to as the second frequency range, and a frequency lower limit of the first frequency range is the same as the frequency lower limit of the second frequency range. Details are not described below again.

In a possible implementation, the tile information includes one or more of the following: a first quantity, identification information, relationship information, a quantity of changed tiles, or the like.

The first quantity is a quantity of tiles in the first frequency range.

It should be noted that in this disclosure, a frequency range may be divided into frequency areas (tiles). Each tile may be further divided into at least one frequency band in a preset frequency band division manner, and one frequency band may be understood as one scale factor band (SFB). For example, a tile may be divided in a unit of 1 kHz, and then a frequency band is divided in a unit of 200 hertz (Hz) in each tile. It may be understood that frequency widths corresponding to different tiles may be the same or different, and frequency widths corresponding to different frequency bands may be the same or different.

The identification information indicates whether the first frequency range is the same as the second frequency range corresponding to the bandwidth extension. For example, if the identification information includes 0, it indicates that the first frequency range is different from the second frequency range. If the identification information includes 1, it indicates that the first frequency range is the same as the second frequency range.

The relationship information indicates a value relationship between the first frequency range and the second frequency range. For example, two bits may indicate the value relationship between the first frequency range and the second frequency range, for example, a same relationship, an increase relationship, or a decrease relationship. For example, if the relationship information includes 00, it indicates that the first frequency range is equal to the second frequency range. If the relationship information includes 01, it indicates that the first frequency range is greater than the second frequency range. If the relationship information includes 10, it indicates that the first frequency range is less than the second frequency range.

The quantity of changed tiles is a quantity of tiles in which there is a difference between the first frequency range and the second frequency range. For example, a range of the quantity of changed tiles may be [−N, N], where N indicates that the first frequency range has N more tiles than the second frequency range, and −N indicates that the first frequency range has N less tiles than the second frequency range.

Generally, in an actual application scenario, the tile information includes at least the first quantity. Optionally, the tile information further includes but is not limited to one or more of the identification information, the relationship information, or the quantity of changed tiles.

In addition, indicating the first frequency range by using the tile information may be understood as follows. If the tile information includes the first quantity, a boundary of each tile in the first quantity of tiles, that is, a frequency range covered by each tile, may be determined by querying the preset table, to obtain the first frequency range. A lower boundary of a first tile in the first quantity of tiles is a lower boundary of the second frequency range in which the bandwidth extension is performed. It may be understood that when the first quantity of tiles is continuous in frequency domain, the first frequency range may alternatively be determined based on only the lower boundary of the first tile and an upper boundary of a last tile.

In addition, when the tile information includes the identification information, if the identification information indicates that the first frequency range is the same as the second frequency range, the second frequency range may be used as the first frequency range. If the identification information indicates that the first frequency range is different from the second frequency range, the value relationship between the first frequency range and the second frequency range may be determined based on the relationship information. For example, the first frequency range is greater than the second frequency range, or the second frequency range is greater than the first frequency range. Certainly, if the identification information indicates that the first frequency range is the same as the second frequency range, the tile information may also include the relationship information. In this case, the relationship information may alternatively indicate that the first frequency range is the same as the second frequency range. When it is determined, based on the identification information or the relationship information, that the first frequency range is different from the second frequency range, the value relationship between the first frequency range and the second frequency range may be determined based on the relationship information. Then, the quantity of tiles in a different frequency range between the first frequency range and the second frequency range is determined based on the quantity of changed tiles. Then, a specific range of the first frequency range is determined in a preset manner such as table lookup or preset bandwidth planning. For example, if the first frequency range and the second frequency range are different, which frequency range in the first frequency range and the second frequency range is larger may be determined based on the relationship information. For example, if the first frequency range is greater than the second frequency range, the preset table may be queried based on a quantity of tiles in a non-overlapping part of the first frequency range and the second frequency range, or division is performed based on a preset bandwidth, to obtain a boundary of the non-overlapping part of the first frequency range and the second frequency range. Therefore, an accurate frequency range covered by the first frequency range is determined.

Further, there are a plurality of manners of obtaining the tile information, which are separately described in the following.

Manner 1: The tile information is determined based on a sampling frequency of the audio signal and the preset configuration information of the bandwidth extension.

The tile information includes at least the first quantity, and there is at least one channel of the audio signal. The following uses a current channel in the at least one channel as an example to describe step 503. Step 503 may further include determining a first quantity of current channels based on one or more of an encoding rate of the current frame, the quantity of channels of the audio signal, the sampling frequency, the bandwidth extension upper limit, or the second quantity.

Further, the first quantity may be determined based on a first determining identifier of the current channel, or the first quantity may be determined based on a second determining identifier, or the first quantity may be determined based on a first determining identifier and a second determining identifier of the current channel. Before this, a first determining identifier of each channel in the current frame may be determined based on the encoding rate of the current frame and the quantity of channels, where the first determining identifier includes the first determining identifier of the current channel. Alternatively, the second determining identifier is determined based on the sampling frequency and the bandwidth extension upper limit. The encoding rate of the current frame is a total encoding rate of all channels in the current frame.

Furthermore, a specific manner of obtaining the first determining identifier of the current channel may include but is not limited to one or more of the following.

1. An average encoding rate of each channel in the current frame is obtained based on the encoding rate of the current frame and the quantity of channels, and the average encoding rate is compared with a first threshold to obtain the first determining identifier of the current channel. For example, the average encoding rate of each channel may be obtained by dividing the encoding rate of the current frame by the quantity of channels. The average encoding rate is compared with the first threshold, and the first determining identifier of the current channel is obtained based on a comparison result. For example, when the average encoding rate is higher than 24 kilobits per second (kbps) (that is, 24,000 bits per second) (that is, the first threshold, which may alternatively be another value, such as 32 kbps or 128 kbps), a value of the first determining identifier of the current channel is determined as 1. When the average encoding rate is not higher than 24 kbps, the value of the first determining identifier of the current channel is determined as 0.

2. An actual encoding rate of each channel in the current frame is determined based on the encoding rate of the current frame and the quantity of channels, and the actual encoding rate of each channel is compared with a second threshold to obtain the first determining identifier of each channel. It may be understood that the actual encoding rate may be allocated to each channel based on the total encoding rate of the current frame. The first determining identifier of each channel may be obtained by comparing the actual encoding rate of each channel with the second threshold. A manner of determining the actual encoding rate of each channel may include a plurality of manners. For example, the encoding rate may be randomly allocated to each channel. Alternatively, the encoding rate may be allocated to each channel based on a data size of each channel. A larger data volume of a channel indicates a larger allocated encoding rate. Alternatively, the encoding rate may be allocated to each channel in a fixed manner. A specific allocation manner may be adjusted based on an actual application scenario. For example, if the total available encoding rate (that is, the encoding rate of the current frame) of the current audio signal is 256 kbps, and the audio signal has three channels, for example, a channel 1, a channel 2, and a channel 3, the encoding rate may be allocated to the three channels. For example, 192 kbps is allocated to the channel 1, 44 kbps is allocated to the channel 2, and 20 kbps is allocated to the channel 3. Then, the actual encoding rate of each channel is compared with 64 kbps (that is, the second threshold). When the actual encoding rate of the current channel is higher than 64 kbps, the value of the first determining identifier of the current channel is determined as 1. When the actual encoding rate of the current channel is not higher than 64 kbps, the value of the first determining identifier of the current channel is determined as 0. An obtained value of a first determining identifier of the channel 1 is 1, and values of first determining identifiers of the channel 2 and the channel 3 are 0.

Further, a specific manner of obtaining the second determining identifier of the current channel may include, when the bandwidth extension upper limit includes the highest frequency, comparing whether the highest frequency included in the bandwidth extension upper limit is the same as a highest frequency of the audio signal, to determine the second determining identifier, where the highest frequency of the audio signal is generally half of the sampling frequency, and certainly, the sampling frequency may alternatively be set to be greater than twice the highest frequency, or when the bandwidth extension upper limit includes the highest frequency band index, comparing whether the highest frequency band index included in the bandwidth extension upper limit is the same as a highest frequency band index of the audio signal, to determine the second determining identifier, where the highest frequency band index of the audio signal is determined based on the sampling frequency, and the highest frequency band index of the audio signal may be an index of a frequency band in which the highest frequency of the audio signal is located. In addition, the second determining identifier may alternatively be determined by comparing whether the highest bin index included in the bandwidth extension upper limit is the same as a highest bin index of the audio signal, or by comparing whether the highest tile index included in the bandwidth extension upper limit is the same as a highest tile index of the audio signal.

In addition, when a type of data included in the bandwidth extension upper limit is different from a type of data of the highest frequency of the obtained audio signal, the data included in the bandwidth extension upper limit and the data of the highest frequency of the obtained audio signal may be converted into a same type, and then data of the same type is compared to obtain the second determining identifier. For example, when the bandwidth extension upper limit includes the highest frequency, and the highest bin index of the audio signal is obtained, the highest frequency corresponding to the highest bin index of the audio signal may be determined, and the highest frequency included in the bandwidth extension upper limit is compared with the determined highest frequency corresponding to the audio signal to obtain the second determining identifier.

A specific manner of determining the second determining identifier is, for example, if the highest frequency included in the bandwidth extension upper limit is equal to the highest frequency of the audio signal, a value of the second determining identifier may be 0, otherwise, a value of the second determining identifier is 1. For another example, the highest frequency band index corresponding to the bandwidth extension upper limit is compared with the highest frequency band index of the audio signal. When the highest frequency band index included in the bandwidth extension upper limit is equal to the highest frequency band index of the audio signal, the value of the second determining identifier may be 0, otherwise, the value of the second determining identifier is 1. Generally, the highest frequency corresponding to the bandwidth extension upper limit does not exceed the highest frequency of the audio signal.

Further, a specific manner of determining the first quantity may include, if both the first determining identifier and the second determining identifier of the current channel meet a preset condition, adding one or more tiles to the second quantity as the first quantity of current channels. A specific quantity of added tiles may be adjusted based on an actual application scenario. Further, the preset condition may be that: the average encoding rate of the current channel is greater than the first threshold, or the actual encoding rate of the current channel is greater than the second threshold, and the highest frequency band index included in the bandwidth extension upper limit is not equal to the highest frequency band index of the audio signal, or the highest frequency band index included in the bandwidth extension upper limit is not equal to the highest frequency band index of the audio signal, or the highest bin index included in the bandwidth extension upper limit is not equal to the highest bin index of the audio signal.

For example, the quantity of added tiles may be determined based on a difference between the highest frequency of the audio signal and the bandwidth extension upper limit, and the difference between the highest frequency of the audio signal and the bandwidth extension upper limit is divided into one or more tiles, so that a frequency upper limit of the first frequency range is higher than the highest frequency corresponding to the bandwidth extension upper limit. In this way, information about more tonal components in the high frequency band signal can be detected. Further, for example, the foregoing preset condition may be that both the first determining identifier and the second determining identifier are 1. If both the first determining identifier and the second determining identifier of the current channel are 1, the one or more tiles are added to the second quantity to obtain the first quantity of current channels. The added one or more tiles may be obtained by dividing, in a preset division manner, a part that is of the first frequency range and that is higher than the bandwidth extension upper limit.

If at least one of the first determining identifier and the second determining identifier does not meet the preset condition, the second quantity is used as the first quantity. It may be understood that when the highest frequency of the audio signal is in the second frequency range, the second frequency range may be directly used as the first frequency range, and tonal component detection may be performed in the first frequency range. Alternatively, more comprehensive detection of tonal components in the high frequency band signal may be implemented.

For ease of understanding, the following uses a specific application scenario as an example to describe an example of a determining manner of determining the first quantity of current channels.

Generally, whether to add an additional tile to the second quantity to obtain the first quantity of current channels may be jointly determined by the following two conditions.

1. When the overall encoding rate of the audio signal is relatively low, bit consumption introduced by the additional tile may have a negative impact on an encoding effect, and encoding efficiency or encoding quality may be reduced. Therefore, whether the additional tile needs to be added may be first selected based on the encoding rate of each channel. It is assumed that a total rate of an encoder is bitrate_tot and a quantity of channels is n_channels. In this case, a quantity of bits of each channel is bitrate_ch=bitrate_tot/n_channels. Alternatively, bitrate_ch may be obtained by separately allocating bitrate_tot to each channel. bitrate_ch is compared with the preset first threshold. If bitrate_ch exceeds the first threshold, a flag flag_addTile (that is, the first determining identifier) is set to 1, otherwise, flag_addTile is set to 0.

2. A stop SFB index obtained through bandwidth extension processing such as intelligent gap filling (IGF) and a total quantity of SFBs may be compared, to determine whether a frequency range corresponding to the IGF can cover a full frequency band of the audio signal. If the frequency range corresponding to the IGF cannot cover the full frequency band of the audio signal, one or more tiles are added.

A manner of determining, with reference to the foregoing two conditions, whether to add the tile is as follows:

```
if igfStopSfb < nr_of_sfb_long && flag_addTile == 1:
    num_tiles_detect = num_tiles+1
else
    num_tiles_detect = num_tiles
end
```

igfStopSfb is the IGF stop SFB index, nr_of_sfb_long is the total quantity of SFBs, flag_addTile is the first determining identifier, num_tiles is a quantity of tiles in an IGF frequency band, and num_tiles_detect is a quantity of tiles in which tonal component detection is performed.

In a possible implementation, the quantity of tiles in the first frequency range may alternatively be a preset quantity. Further, the preset quantity may be determined by a user, or may be determined based on an empirical value. This may be further adjusted based on an actual application scenario.

Optionally, when the quantity of tiles in the first frequency range is the preset quantity, the preset quantity may be written into a configuration bitstream, or may not be written into a configuration bitstream. For example, an encoding device and a decoding device may consider by default that the quantity of tiles is a quantity of tiles included in the second frequency range plus N, where N may be a preset positive integer.

In addition, in addition to obtaining the first quantity of current channels, other information of the current channel may be further obtained, for example, the identification information, the relationship information, or the quantity of changed tiles. For example, whether the first frequency range is the same as the second frequency range may be compared to obtain the identification information, the value relationship between the first frequency range and the second frequency range may be compared to obtain the relationship information, and the difference between the first quantity and the second quantity may be compared to obtain the quantity of changed tiles.

Manner 2: tile information used by the previous frame or a first frame of the audio signal is obtained as the tile information of the current frame.

The tile information may be obtained in the foregoing manner 1 when the previous frame of the current frame is encoded. The tile information may be directly read when the current frame is obtained. The tile information may alternatively be obtained in the manner 1 when the first frame of the audio signal is encoded. For example, all frames included in the audio signal may be encoded by using same tile information, thereby reducing a workload of the encoding device and improving the encoding efficiency.

Therefore, in this implementation of this disclosure, the tile information may be obtained in a plurality of manners, and tile information used by each frame may be dynamically determined in real time in the manner 1, so that a frequency range indicated by the tile information may adaptively cover a frequency range in which a tonal component of the high frequency band signal is dissimilar to that of the low frequency band signal in each frame. This improves the encoding quality. Alternatively, a plurality of frames may share same tile information, thereby reducing a workload of calculating the tile information, and improving the encoding quality and the encoding efficiency. Therefore, the audio signal encoding method provided in this disclosure can flexibly adapt to more scenarios.

In addition, in addition to determining the first quantity of tiles in which tonal component detection needs to be performed, a boundary of each tile in which tonal component detection needs to be performed, that is, a first tile boundary, may be further determined based on the tile information, so that the first frequency range can be determined more accurately. It may be understood that, after the quantity of tiles in the first frequency range is determined, a division manner of each tile in the first frequency range further needs to be determined.

Further, a lower limit of the first frequency range is the same as a lower limit of the second frequency range in which the bandwidth extension indicated by the configuration information is performed. When the first quantity is less than or equal to the second quantity, distribution of the tile in the first frequency range is the same as distribution of the tile in the second frequency range indicated in the configuration information, in other words, a division manner of the tile in the first frequency range is the same as a division manner of the tile in the second frequency range. When the first quantity is greater than the second quantity, a frequency upper limit of the first frequency range is greater than a frequency upper limit of the second frequency range, in other words, the first frequency range covers and is greater than the second frequency range. Distribution of a tile in an overlapping part of the first frequency range and the second frequency range is the same as distribution of the tile in the second frequency range. In other words, a division manner of the tile in the overlapping part of the first frequency range and the second frequency range is the same as the division manner of the tile in the second frequency range. Distribution of a tile in a non-overlapping part of the first frequency range and the second frequency range is determined in a preset manner. In other words, the tile in the non-overlapping part of the first frequency range and the second frequency range is divided in the preset manner.

It may be understood that, generally, a division manner of a tile in which the bandwidth extension is performed is pre-configured, to be specific, the configuration information may include division into the tile in the second frequency range. When the first quantity is less than or equal to the second quantity corresponding to the bandwidth extension, the first frequency range may be divided in the division manner of the tile in the second frequency range to obtain each tile in the first frequency range. For example, if the tile in the second frequency range is divided in a unit of 1 kHz, the first frequency range may also be divided in a unit of 1 kHz, to obtain one or more tiles in the first frequency range. When the first quantity is greater than the second quantity corresponding to the bandwidth extension, it may be determined that the frequency upper limit of the first frequency range is greater than the upper limit of the second frequency range. The first frequency range may completely cover and be greater than the second frequency range, the overlapping part of the second frequency range and the first frequency range may be divided in the division manner of the tile in the second frequency range, and the non-overlapping of the second frequency range and the first frequency range, namely, the tiles corresponding to the difference between the first quantity and the second quantity, may be divided in the preset manner. Therefore, the boundary of each tile included in the first frequency range in which tonal component detection needs to be performed is accurately determined. The preset manner may include a preset width, a frequency upper limit of the tile, and the like.

Figure 6A:
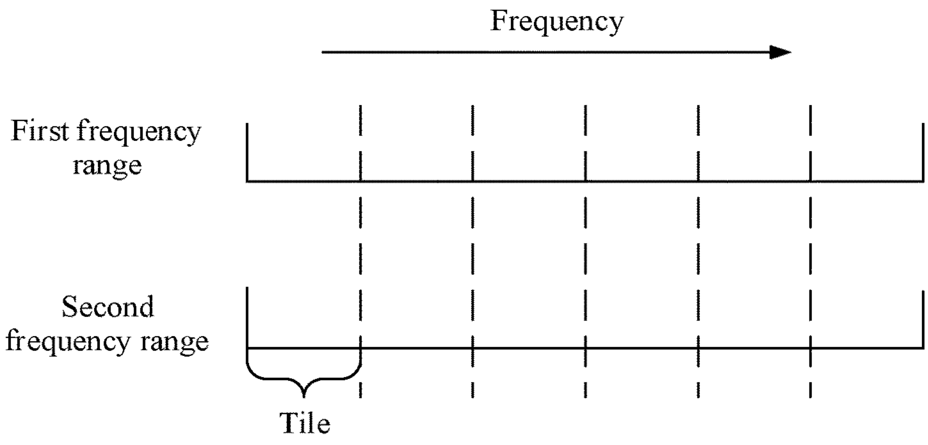
FIG. 6A is a schematic diagram of a tile division manner according to an embodiment of this disclosure.
Figure 6B:
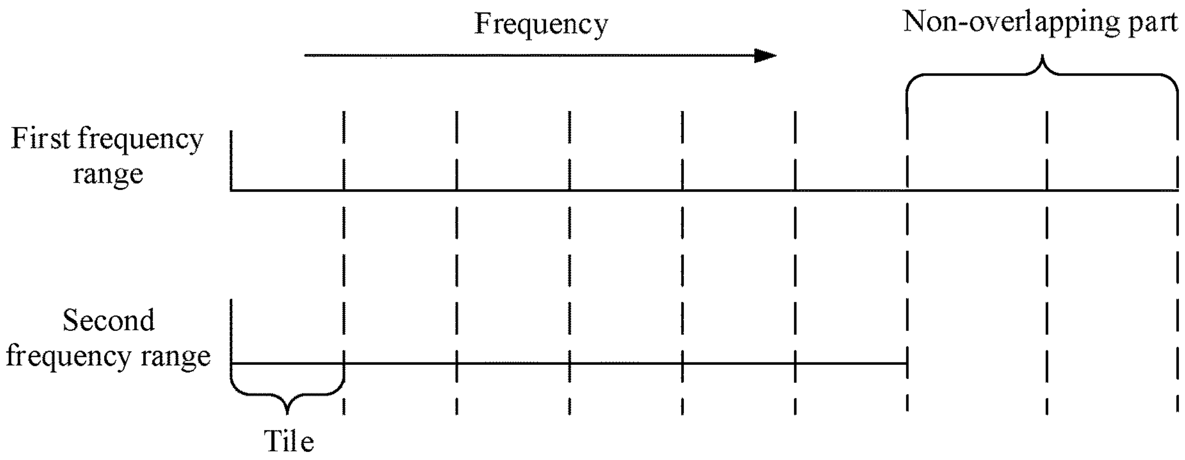
FIG. 6B is a schematic diagram of another tile division manner according to an embodiment of this disclosure.
Figure 6C:
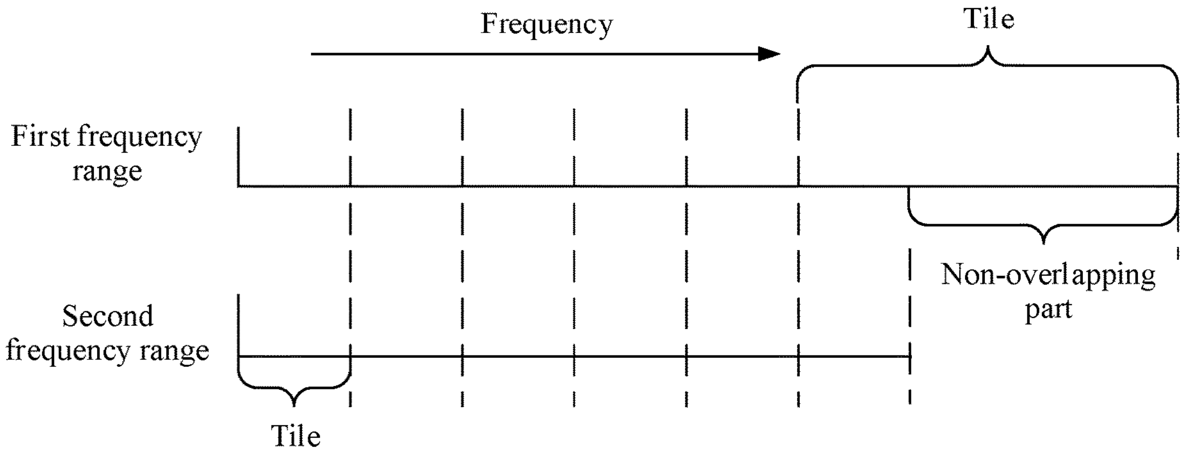
FIG. 6C is a schematic diagram of another tile division manner according to an embodiment of this disclosure.

For example, for ease of understanding, for a scenario in which the first quantity is less than or equal to the second quantity, refer to FIG. 6A. The division manner of the tile in the first frequency range is the same as the division manner of the tile in the second frequency range. For a scenario in which the first quantity is greater than the second quantity, refer to FIG. 6B. The division manner of the tile in the overlapping part of the first frequency range and the second frequency range is the same as the division manner of the tile in the second frequency range. Division of one or more tiles in the first frequency range relative to the second frequency range, namely, division of the tiles corresponding to the difference between the first quantity and the second quantity, may be performed in the preset manner. A division manner of the tile in non-overlapping part of the first frequency range and the second frequency range may be the same as or different from the division manner of the tile in the overlapping part. For example, the non-overlapping part may be divided into one or more tiles. Certainly, the non-overlapping part may alternatively be divided into a last tile of the overlapping part, as shown in FIG. 6C.

If the non-overlapping part is divided into one or more tiles, a condition that the tile divided by the non-overlapping part needs to meet may include a frequency upper limit of the tile is less than or equal to the highest frequency of the audio signal. Generally, the frequency upper limit of the tile is less than or equal to the highest frequency of the audio signal, and a width of the tile is less than or equal to a preset value.

It may be understood that the quantity of changed tiles included in the foregoing tile information is a quantity of tiles included in the non-overlapping part of the first frequency range and the second frequency range.

In a specific scenario, frequency bands in the tile may be numbered. In this case, a frequency band index corresponding to the frequency upper limit of the tile in the non-overlapping part is less than or equal to a frequency band index corresponding to the highest frequency of the audio signal, and the width of the tile in the non-overlapping part is less than or equal to the preset value. The frequency band index corresponding to the highest frequency of the audio signal is determined based on the sampling frequency and the frequency band division manner.

It should be understood that, for two adjacent tiles, a frequency upper limit of a tile in which a lower frequency is located is a lower limit of a tile in which a higher frequency is located.

Therefore, in this implementation of this disclosure, the quantity of tiles in the first frequency range and the division manner of each tile are determined, so that during subsequent tonal component detection, detection can be performed based on the tile, to obtain more comprehensive tonal component detection. For example, tonal component detection may be performed in a unit of a tile, or tonal component detection may be performed in a unit of a frequency band in the tile.

It may be understood that, after the first quantity of tiles included in the first frequency range is determined, the boundary of each tile included in the first frequency range is further determined. Further, a manner of determining the boundary of each tile included in the first frequency range may include, if the first quantity is less than or equal to the second quantity, determining, based on a boundary of each tile in the second frequency range, the boundary of the tile included in the first frequency range. If the first quantity is greater than the second quantity, for the overlapping part of the first frequency range and the second frequency range, the boundary of each tile included in the first frequency range may be determined based on the boundary of each tile in the second frequency range, and for the non-overlapping part of the first frequency range and the second frequency range, a tile may be divided in a preset division manner, and the boundary of the tile is determined.

Further, a manner of determining the boundary of each tile in the first frequency range may include, if the first quantity is less than or equal to the second quantity, using the boundary of each tile in the second frequency range corresponding to the bandwidth extension as the boundary of each tile in the first frequency range, and if the first quantity is greater than the second quantity, using the boundary of each tile in the second frequency range as a boundary of at least one low tile in the first frequency range, and determining a boundary of at least one high tile in a preset manner, where the low tile is a tile whose frequency upper limit is lower than the bandwidth extension upper limit in the first frequency range, and the high tile is a tile whose frequency lower limit is higher than or equal to the bandwidth extension upper limit in the first frequency range.

A first tile of the at least one high tile is used as an example for description. The determining a boundary of at least one high tile in a preset manner may further include using a frequency upper limit of a tile that is adjacent to the first tile and whose frequency is lower than a frequency of the first tile as a frequency lower limit of the first tile, and determining the frequency upper limit of the first tile in the preset manner, where the first tile is included in the at least one high tile. The frequency upper limit of the first tile is less than or equal to the highest frequency of the audio signal, and a width of the first tile is less than or equal to the preset value. Alternatively, a frequency band index corresponding to the frequency upper limit of the first tile is less than or equal to the frequency band index corresponding to the highest frequency of the audio signal, and the width of the first tile is less than or equal to the preset value. The frequency band index corresponding to the highest frequency of the audio signal is determined based on the sampling frequency and the preset frequency band division manner.

The following uses a specific application scenario as an example to describe an example of a manner of determining each tile in the first frequency range.

Generally, after the quantity of tiles in which tonal component detection needs to be performed is determined, a boundary of a tile in which tonal component detection is performed further needs to be first determined based on the quantity of tiles in which tonal component detection is performed. The boundary of the tile may be an SFB index of the boundary, or may be a frequency of the boundary, or may include both.

To improve tonal component detection efficiency and encoding efficiency, an added tile does not need to cover an entire remaining high frequency band from IGF stop frequency to Fs/2. Therefore, a maximum width of the added tile may be limited to 128 bins, in other words, the width of the tile is less than or equal to the preset value. Fs is the sampling frequency.

For example, a manner of determining the width of the added tile and a manner of updating a tile frequency band table and a tile-sfb correspondence table are as follows:

```
for sfbIdx = igfStopSfb to nr_of_sfb_long−1
  tileWidth_new = sfb_offset[sfbIdx+1] − sfb_offset[igfStopSfb]
  if tileWidth_new > 128
    tile[num_tiles_detect] = sfb_offset[sfbIdx]
    tile_sfb_wrap[num_tiles_detect] = sfbIdx
    break
  else if (sfbIdx+1) == nr_of_sfb_long
    tile[num_tiles_detect] = sfb_offset[sfbIdx+1]
    tile_sfb_wrap[num_tiles_detect] = sfbIdx+1
    break
  end
end
```

igfStopSfb is the IGF stop SFB index, sfbIdx is an SFB index, tileWidth_new is the width of the added tile, nr_of_sfb_long is the total quantity of SFBs, sfb_offset is an SFB boundary, a lower limit of an $i^{th}$ SFB is sfb_offset[i], an upper limit is sfb_offset[i+1], tile_sfb_wrap indicates a correspondence between a tile and an SFB, a start SFB index of an $i^{th}$ tile is tile_sib_wrap [i], and an end SFB index is tile_sfb_wrap [i+1]−1.

Therefore, in this implementation of this disclosure, the boundary of each tile in the first frequency range can be determined, so that tonal component detection can be performed more accurately.

504: Perform tone component detection in the first frequency range to obtain information about a tonal component of the high frequency band signal.

After the first frequency range indicated by the tile information is determined, tonal component detection is performed in the first frequency range to obtain the information about the tonal component of the high frequency band signal.

Further, the information about the tonal component may include a position quantity parameter of the tonal component, and an amplitude parameter or an energy parameter of the tonal component. Alternatively, the information about the tonal component further includes a noise floor parameter of the high frequency band signal. The position quantity parameter represents a position of the tonal component and a quantity of tonal components that are represented by a same parameter. In another implementation, the information about the tonal component may include a position parameter of the tonal component, a quantity parameter of the tonal component, and an amplitude parameter or an energy parameter of the tonal component. In this case, a position of the tonal component and a quantity of tonal components are represented by using different parameters.

Furthermore, the first frequency range indicated in the tile information may include one or more tiles, one tile may include one or more frequency bands, and one frequency band may include one or more subbands. Step 504 may further include determining a position quantity parameter of a tonal component of a current tile and an amplitude parameter or an energy parameter of the tonal component of the current tile based on a high frequency band signal of the current tile in the first quantity of tiles in high frequency band signals.

In addition to performing tonal component detection in a unit of a tile, tonal component detection may be performed in a unit of a frequency band or in a unit of a subband, and details are not described herein again.

Before information about the tonal component of the current tile is determined, it may be determined whether the current tile includes the tonal component. Only when the current tile includes the tonal component, the position quantity parameter of the tonal component of the current tile and the amplitude parameter or the energy parameter of the tonal component of the current tile are determined based on the high frequency band signal of the current tile. In this way, only a parameter of the tile including the tonal component is obtained. This improves the encoding efficiency.

Correspondingly, the information about the tonal component of the current frame further includes tonal component indication information, and the tonal component indication information indicates whether the current tile includes the tonal component. In this way, an audio decoder can perform decoding based on the indication information. This improves decoding efficiency.

In an implementation, the determining the information about the tonal component of the current tile based on the high frequency band signal of the current tile may include performing peak search in the current tile based on the high frequency band signal of the current tile in at least one tile to obtain at least one of peak quantity information, peak position information, and peak amplitude information of the current tile, and determining the position quantity parameter of the tonal component of the current tile and the amplitude parameter or the energy parameter of the tonal component of the current tile based on at least one of the peak quantity information, the peak position information, and the peak amplitude information of the current tile.

The high frequency band signal on which peak search is performed may be a frequency domain signal, or may be a time domain signal.

Further, in an implementation, peak search may be further performed based on at least one of a power spectrum, an energy spectrum, or an amplitude spectrum of the current tile.

In an implementation, determining the position quantity parameter of the tonal component of the current tile and the amplitude parameter or the energy parameter of the tonal component of the current tile based on at least one of the peak quantity information, the peak position information, and the peak amplitude information of the current tile may include determining position information, quantity information, and amplitude information of the tonal component of the current tile based on at least one of the peak quantity information, the peak position information, and the peak amplitude information of the current tile, and determining the position quantity parameter of the tonal component of the current tile and the amplitude parameter or the energy parameter of the tonal component of the current tile based on the position information, the quantity information, and the amplitude information of the tonal component of the current tile.

505: Perform bitstream multiplexing on the parameter of the bandwidth extension and the information about the tonal component to obtain a payload bitstream.

After the parameter of the bandwidth extension and the information about the tonal component of the high frequency band signal are obtained, bitstream multiplexing may be performed on the parameter of the bandwidth extension and the information about the tonal component to obtain the payload bitstream.

Further, during bitstream multiplexing, in addition to performing bitstream multiplexing on the parameter of the bandwidth extension and the information about the tonal component, bitstream multiplexing may be performed with reference to other information of the low frequency band signal or the high frequency band signal. For example, bitstream multiplexing is performed with reference to an encoding parameter, a time domain noise shaping parameter, a frequency domain noise shaping parameter, or a spectral quantization parameter of the low frequency band signal, to obtain a high-quality payload bitstream.

Further, during bitstream multiplexing, signal type information may indicate whether a tonal component exists in a tile or a frequency band. If no tonal component exists, signal type information indicating that no tonal component exists in the tile or frequency band may be written into a bitstream, to indicate that no tonal component exists in the tile or frequency band. This improves the decoding efficiency. If the tonal component exists, the information about the tonal component needs to be written into the bitstream, signal type information indicating the tonal component exists in which tiles is further written into the bitstream, and the parameter of the bandwidth extension, the time domain noise shaping parameter, the frequency domain noise shaping parameter, or the spectral quantization parameter is written into the bitstream, to improve the encoding quality.

506: Perform bitstream multiplexing on the tile information to obtain a configuration bitstream.

After the tile information is obtained, bitstream multiplexing may be performed on the tile information to obtain the configuration bitstream.

Further, the tile information may be written into the configuration bitstream, so that the decoding device may decode the audio signal based on the tile information included in the configuration bitstream, to reconstruct the tonal component of the frequency range indicated by the tile information, so as to obtain high-quality decoded data.

It should be noted that step 506 in this embodiment of this disclosure is an optional step. Step 506 may be performed when bitstream multiplexing is performed on the first frame of the audio signal, and step 506 does not need to be performed when bitstream multiplexing is performed on each frame. In other words, the plurality of frames in the audio signal may share the same tile information, thereby reducing occupied resources and improving the encoding efficiency. Certainly, step 506 may alternatively be performed when each frame is encoded. This is not limited in this disclosure.

It may be understood that the payload bitstream may carry specific information of each frame of the audio signal, and the configuration bitstream may carry configuration information shared by all frames of the audio signal. The payload bitstream and the configuration bitstream may be bitstreams independent of each other, or may be included in a same bitstream. In other words, the payload bitstream and the configuration bitstream may be different parts of a same bitstream. This may be further adjusted based on an actual application scenario. This is not limited in this disclosure.

Therefore, in this implementation of this disclosure, tonal component detection may be performed based on the frequency range indicated by the tile information, so that the information about the tonal component obtained through detection can cover more frequency ranges in which tonal components are dissimilar between the high frequency band signal and the low frequency band signal. This improves the encoding quality.

The foregoing describes in detail the audio signal encoding method provided in this disclosure, and the following describes in detail the decoding method provided in this disclosure.

Figure 7:
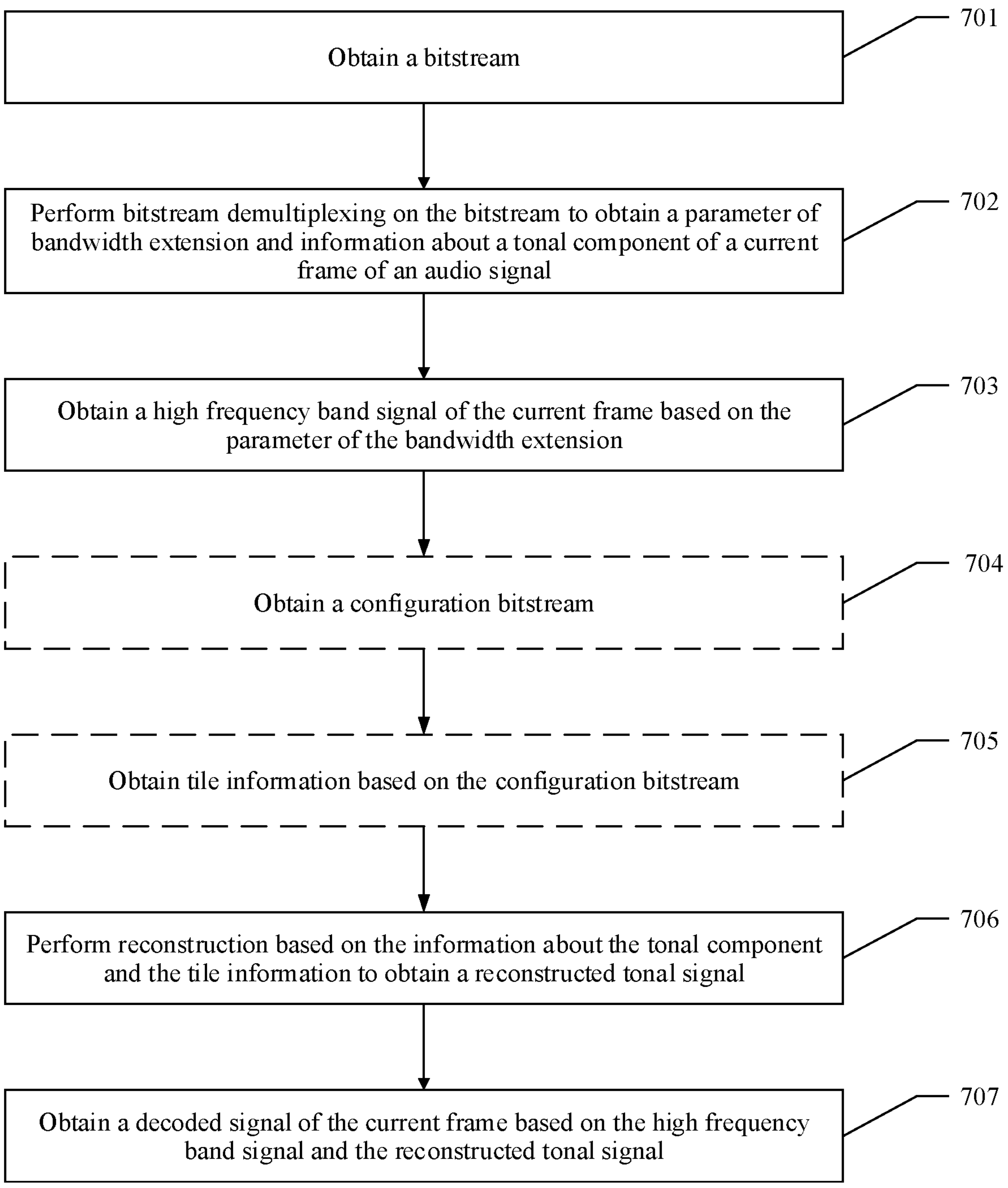
FIG. 7 is a schematic flowchart of a decoding method according to this disclosure.

FIG. 7 is a schematic flowchart of a decoding method according to this disclosure. Details are as follows.

701: Obtain a payload bitstream.

For the payload bitstream, refer to related descriptions in step 505. Details are not described herein again.

702: Perform bitstream demultiplexing on the payload bitstream to obtain a parameter of bandwidth extension and information about a tonal component of a current frame of an audio signal.

After the payload bitstream is obtained, bitstream demultiplexing is performed on the bitstream to obtain the parameter of the bandwidth extension and the information about the tonal component of the current frame of the audio signal.

Further, the information about the tonal component may include a position quantity parameter of the tonal component, and an amplitude parameter or an energy parameter of the tonal component. The position quantity parameter represents a position of the tonal component and a quantity of tonal components that are represented by a same parameter. In another implementation, the information about the tonal component includes a position parameter of the tonal component, a quantity parameter of the tonal component, and an amplitude parameter or an energy parameter of the tonal component. In this case, a position of the tonal component and a quantity of tonal components are represented by using different parameters.

In a possible implementation, a frequency range corresponding to a high frequency band signal includes at least one tile. One tile includes at least one frequency band, and one frequency band includes at least one subband. Correspondingly, the information about the tonal component includes that the position quantity parameter of the tonal component of the high frequency band signal of the current frame includes a position quantity parameter of a respective tonal component of at least one tile, and the amplitude parameter or the energy parameter of the tonal component of the high frequency band signal of the current frame includes an amplitude parameter or an energy parameter of the respective tonal component of the at least one tile. It may be understood that the information about the tonal component may be in a unit of a tile. Certainly, the information about the tonal component may alternatively be in a unit of a frequency band, in a unit of a subband, or the like. This may be further adjusted based on an actual application scenario.

In a possible implementation, performing bitstream demultiplexing on the payload bitstream to obtain the information about the tonal component of the current frame of the audio signal includes obtaining a position quantity parameter of a tonal component of a current tile or a current frequency band of the at least one tile, and parsing the payload bitstream to obtain an amplitude parameter or an energy parameter of the tonal component of the current tile or the current frequency band based on the position quantity parameter of the tonal component of the current tile or the current frequency band.

In addition, bitstream demultiplexing is performed on the payload bitstream. In addition to the parameter of the bandwidth extension and the information about the tonal component of the current frame of the audio signal, parameters/a parameter related to a low frequency band signal may be obtained, for example, a low frequency band encoding parameter, a time domain noise shaping parameter, a frequency domain noise shaping parameter, and/or a spectral quantization parameter.

It should be noted that in this implementation of this disclosure, the audio signal may be a multi-channel signal, or may be a single-channel signal. When the audio signal is a multi-channel signal, demultiplexing, signal reconstruction, and the like may be performed on a payload bitstream of a signal of each channel. In this implementation of this disclosure, only an encoding process of a signal of one channel (referred to as a current channel below) is used as an example for description. In actual application, the steps 702 to 707 may be performed for each channel in the audio signal. Repeated steps are not described again in this disclosure.

703: Obtain the high frequency band signal of the current frame based on the parameter of the bandwidth extension.

For the parameter of the bandwidth extension, refer to related descriptions in step 502. Details are not described herein again.

Further, in a time domain extension scenario, time domain extension may be performed based on the parameter of the bandwidth extension, for example, a high frequency band LPC parameter, a high frequency band gain, or a filtering parameter, to obtain the high frequency band signal. Alternatively, in a frequency domain extension scenario, frequency domain extension may be performed based on a parameter such as a time envelope or a frequency envelope to obtain the high frequency band signal.

In addition, decoding may be performed based on an encoding parameter of a low frequency band obtained by demultiplexing the bitstream, to obtain the low frequency band signal. When the bandwidth extension is performed based on the parameter of the bandwidth extension, the high frequency band signal may be further recovered with reference to the low frequency band signal, to obtain a more accurate high frequency band signal. It may be understood that, after the payload bitstream is demultiplexed, correlation information between the low frequency band signal and the high frequency band signal may be obtained, and after the low frequency band signal is obtained, the high frequency band signal may be recovered based on the low frequency band signal and the correlation information between the low frequency band signal and the high frequency band signal to obtain the high frequency band signal.

704: Obtain a configuration bitstream.

The configuration bitstream sent by an encoding device may be received, where the configuration bitstream may include some configuration parameters when the encoding device performs encoding. For the configuration bitstream, refer to related descriptions in step 506. Details are not described herein again.

705: Obtain tile information based on the configuration bitstream.

After the configuration bitstream is obtained, the configuration bitstream may be demultiplexed to obtain the tile information.

For the tile information, refer to related descriptions in step 503. Details are not described herein again.

It should be noted that steps 704 and 705 in this disclosure are optional steps, and may be performed when a bitstream corresponding to a frame of the audio signal is received, that is, a plurality of frames may share the tile information, or may be performed when a bitstream corresponding to each frame of the audio signal is received. This may be further adjusted based on an actual application scenario.

In addition, the encoding device may alternatively send configuration information of the bandwidth extension to a decoding device by using the configuration bitstream, or the encoding device and the decoding device may share preset configuration information. This may be further adjusted based on an actual application scenario.

706: Perform reconstruction based on the information about the tonal component and the tile information to obtain a reconstructed tonal signal.

After the tile information is obtained, a frequency range indicated by the tile information is reconstructed based on the information about the tonal component to obtain the reconstructed tonal signal.

In the following implementations of this disclosure, a frequency range in which tone component reconstruction needs to be performed is referred to as a first frequency range, a frequency range corresponding to the bandwidth extension is referred to as a second frequency range, and a frequency lower limit of the first frequency range is the same as a frequency lower limit of the second frequency range. Details are not described below again.

The first frequency range may be divided into one or more tiles, and one tile may include one or more frequency bands. Performing reconstruction based on the information about the tonal component and the tile information may further include determining, based on the tile information, that a quantity of tiles in which tonal component reconstruction needs to be performed is a first quantity, determining, based on the first quantity, each tile in which tonal component reconstruction is performed in the first frequency range, and reconstructing, in the first frequency range, the tonal component based on the information about the tonal component to obtain the reconstructed tonal signal.

Furthermore, determining, based on the first quantity, each tile in which tonal component reconstruction is performed in the first frequency range may include, if the first quantity is less than or equal to a second quantity of tiles in the second frequency range, determining distribution of a tile in the first frequency range based on distribution of the tile in the second frequency range, that is, determining each tile in the first frequency range based on a division manner of the tile in the second frequency range, and if the first quantity is greater than the second quantity, determining distribution of a tile in an overlapping part of the first frequency range and the second frequency range based on distribution of the tile in the second frequency range, and determining distribution of a tile in a non-overlapping part of the first frequency range and the second frequency range in a preset manner to obtain distribution of the tile in the first frequency range. It may be understood that, if the first quantity is greater than the second quantity, the overlapping part of the first frequency range and the second frequency range may be divided in a manner of dividing the tiles in the second frequency range, and the non-overlapping part of the first frequency range and the second frequency range may be divided in the preset manner to obtain each tile in the first frequency range in which tonal component reconstruction needs to be performed. Therefore, a quantity of tiles in the frequency range in which tonal component reconstruction needs to be performed may be accurately determined in combination with the second quantity in the second frequency range.

Optionally, the tile in the non-overlapping part of the first frequency range and the second frequency range may meet the following conditions: a frequency upper limit of the tile is less than or equal to a highest frequency of the audio signal, where the frequency upper limit of the tile is generally less than or equal to a half of a sampling frequency, and a width of the tile is less than or equal to a preset value.

It should be understood that the configuration information of the bandwidth extension may be obtained by using the configuration bitstream, or the configuration information of the bandwidth extension may be obtained locally, and the second frequency range in which the bandwidth extension is performed, distribution or division manner of the tile in the second frequency range, and the like are determined by using the configuration information, to determine distribution of the tile in the first frequency range based on distribution of the tile in the second frequency range indicated by the configuration information.

When tonal component reconstruction is performed, reconstruction may be performed in a unit of a tile, or reconstruction may be performed in a unit of a frequency band. Refer to related descriptions in the foregoing step 503. The quantity of tiles in which tonal component reconstruction needs to be performed may be num_tiles_detect.

The following uses an example in which tonal component reconstruction is performed in the unit of a tile for description. The reconstructed tonal signal obtained after reconstruction may be a time domain signal, or may be a frequency domain signal.

Further, the information about the tonal component may include a position parameter, a quantity parameter, an amplitude parameter, and the like of the tonal component, and the quantity parameter of the tonal component represents a quantity of tonal components. A method for reconstructing a tonal component in one position may be further as follows:

(1) The position of the tonal component is calculated.

Further, the position of the tonal component may be calculated based on a position parameter of the tonal component:

$$\text{tone\_pos}=\text{tile}[p]+(sfb+0.5)*\text{tone\_res}[p]$$

tile[p] is a start bin of a $p^{th}$ tile, sfb is an index of a subband having a tonal component in a tile, and tone_res[p] is frequency domain resolution of the $p^{th}$ tile (that is, subband width information in the $p^{th}$ tile). The index of the subband having the tonal component in the tile is the position parameter of the tonal component. 0.5 indicates that a position of a tonal component in the subband having the tonal component is located in the center of the subband. Certainly, a reconstructed tonal component may alternatively be located at another position of the subband.

(2) An amplitude of the tonal component is calculated.

Further, the amplitude of the tonal component may be calculated based on an amplitude parameter of the tonal component:

$$\text{tone\_val}=\text{pow}(2.0,0.25*\text{tone\_val\_}q[p][\text{tone\_idx}]-4.0),$$

where tone_val_q[p][tone_idx] represents an amplitude parameter corresponding to a tone_idx$^{th}$ position parameter in the $p^{th}$ tile, and tone_val represents an amplitude value of a bin corresponding to the tone_idx$^{th}$ position parameter in the $p^{th}$ tile.

A value range of tone_idx falls within [0, tone_cnt[p]−1], and tone_cnt[p] is a quantity of tonal components in the $p^{th}$ tile.

(3) Reconstruction is performed based on the position of the tonal component and the amplitude of the tonal component to obtain a reconstructed audio signal.

A frequency domain signal corresponding to the position tone_pos of the tonal component satisfies:

$$\text{pSpectralData}[\text{tone\_pos}]=\text{tone\_val},$$

where pSpectralData[tone_pos] represents the frequency domain signal corresponding to the position tone_pos of the tonal component, tone_val represents the amplitude value of the bin corresponding to the tone_idx$^{th}$ position parameter in the $p^{th}$ tile, and tone_pos represents a position of a tonal component corresponding to the tone_idx$^{th}$ position parameter in the $p^{th}$ tile.

707: Obtain a decoded signal of the current frame based on the high frequency band signal and the reconstructed tonal signal.

In addition to obtaining the decoded signal of the current frame based on the high frequency band signal and the reconstructed tonal signal, a more complete decoded signal of the current frame may be obtained in combination with the low frequency band signal.

Further, after the reconstructed tonal signal is obtained, tonal component recovery is performed with reference to the high frequency band signal to obtain specific details and a tonal component of a high frequency band part in the current frame, and the current frame is recovered with reference to the low frequency band signal to obtain a current frame including a complete tonal component.

Therefore, in this implementation of this disclosure, when restoring the tonal component, the decoding device may restore the tonal component in the first frequency range with reference to the tile information provided by the encoding device, so that the obtained current frame includes a more complete tonal component. Even in a scenario in which a tonal component that is dissimilar to a tonal component in a spectrum of a low frequency band usually exists in a spectrum of the high frequency band, the current frame obtained through decoding can have more tonal components. This improves decoding quality and user experience.

The foregoing describes in detail the audio signal encoding method and the decoding method provided in this disclosure. The following describes in detail an apparatus provided in this disclosure based on the method provided above.

Figure 8:
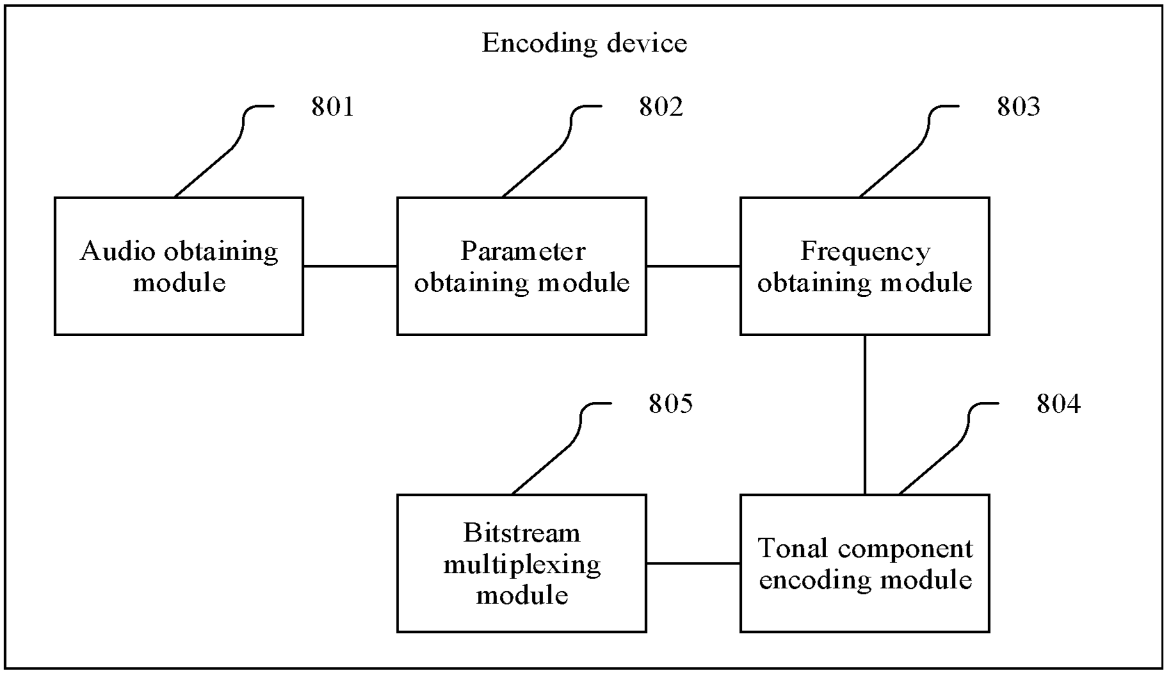
FIG. 8 is a schematic diagram of a structure of an encoding device according to this disclosure.

First, this disclosure provides an encoding device configured to perform the audio signal encoding method shown in FIG. 5. FIG. 8 is a schematic diagram of a structure of an encoding device according to this disclosure.

The encoding device may include an audio obtaining module 801 configured to obtain a current frame of an audio signal, where the current frame includes a high frequency band signal and a low frequency band signal, a parameter obtaining module 802 configured to obtain a parameter of bandwidth extension of the current frame based on the high frequency band signal, the low frequency band signal, and preset configuration information of the bandwidth extension, a frequency obtaining module 803 configured to obtain tile information, where the tile information indicates a first frequency range in which tonal component detection needs to be performed on the high frequency band signal, a tonal component encoding module 804 configured to perform tonal component detection in the first frequency range to obtain information about a tonal component of the high frequency band signal, and a bitstream multiplexing module 805 configured to perform bitstream multiplexing on the parameter of the bandwidth extension and the information about the tonal component to obtain a payload bitstream.

In a possible implementation, the encoding device may further include the bitstream multiplexing module 805 is further configured to perform bitstream multiplexing on the tile information to obtain a configuration bitstream.

In a possible implementation, the frequency obtaining module 803 is further configured to determine the tile information based on a sampling frequency of the audio signal and the configuration information of the bandwidth extension.

In a possible implementation, the tile information includes at least one of the following: a first quantity, identification information, relationship information, or a quantity of changed tiles, where the first quantity is a quantity of tiles in the first frequency range, the identification information indicates whether the first frequency range is the same as a second frequency range corresponding to the bandwidth extension, the relationship information indicates a value relationship between the first frequency range and the second frequency range when the first frequency range is different from the second frequency range, and the quantity of changed tiles is a quantity of tiles in which there is a difference between the first frequency range and the second frequency range when the first frequency range is different from the second frequency range.

In a possible implementation, the tile information includes at least the first quantity, the configuration information of the bandwidth extension includes a bandwidth extension upper limit and/or a second quantity, and the second quantity is a quantity of tiles in the second frequency range, and the frequency obtaining module 803 is further configured to determine the first quantity based on one or more of an encoding rate of the current frame, a quantity of channels of the audio signal, the sampling frequency, the bandwidth extension upper limit, or the second quantity.

In a possible implementation, the bandwidth extension upper limit includes one or more of the following: a highest frequency, a highest bin index, a highest frequency band index, or a highest tile index in the second frequency range.

In a possible implementation, there is at least one channel of the audio signal, the frequency obtaining module 803 is further configured to determine a first determining identifier of a current channel in the current frame based on the encoding rate of the current frame and the quantity of channels, where the encoding rate of the current frame is an encoding rate of all channels the current frame, and determine a first quantity of current channels based on the first determining identifier in combination with the second quantity, or determine a second determining identifier of a current channel in the current frame based on the sampling frequency and the bandwidth extension upper limit, and determine a first quantity of current channels based on the second determining identifier in combination with the second quantity, or determine a first determining identifier of a current channel in the current frame based on the encoding rate of the current frame and the quantity of channels, and determine a second determining identifier of the current channel in the current frame based on the sampling frequency and the bandwidth extension upper limit, and determine a first quantity of current channels in the current frame based on the first determining identifier and the second determining identifier in combination with the second quantity.

In a possible implementation, the frequency obtaining module 803 is further configured to obtain an average encoding rate of each channel in the current frame based on the encoding rate of the current frame and the quantity of channels, and obtain the first determining identifier of the current channel based on the average encoding rate and a first threshold.

In a possible implementation, the frequency obtaining module 803 may be further configured to determine an actual encoding rate of the current channel based on the encoding rate of the current frame and the quantity of channels, and obtain the first determining identifier of the current channel based on the actual encoding rate of the current channel and a second threshold.

In a possible implementation, the frequency obtaining module 803 may be further configured to, when the bandwidth extension upper limit includes the highest frequency, compare whether the highest frequency included in the bandwidth extension upper limit is the same as a highest frequency of the audio signal, to determine the second determining identifier of the current channel in the current frame, or when the bandwidth extension upper limit includes the highest frequency band index, compare whether the highest frequency band index included in the bandwidth extension upper limit is the same as a highest frequency band index of the audio signal, to determine the second determining identifier of the current channel in the current frame, where the highest frequency band index of the audio signal is determined based on the sampling frequency.

In a possible implementation, the frequency obtaining module 803 may be further configured to, if both the first determining identifier and the second determining identifier meet a preset condition, add one or more tiles to the second quantity corresponding to the bandwidth extension to obtain the first quantity of current channels, or if the first determining identifier or the second determining identifier does not meet the preset condition, use the second quantity corresponding to the bandwidth extension as the first quantity of current channels.

In a possible implementation, a lower limit of the first frequency range is the same as a lower limit of the second frequency range in which the bandwidth extension indicated by the configuration information is performed. When the first quantity included in the tile information is less than or equal to the second quantity corresponding to the bandwidth extension, distribution of the tile in the first frequency range is the same as distribution of the tile in the second frequency range. When the first quantity is greater than the second quantity, a frequency upper limit of the first frequency range is greater than a frequency upper limit of the second frequency range, distribution of a tile in an overlapping part of the first frequency range and the second frequency range is the same as distribution of the tile in the second frequency range, and distribution of a tile in a non-overlapping part of the first frequency range and the second frequency range is determined in a preset manner.

In a possible implementation, the tile in the non-overlapping part of the first frequency range and the second frequency range meets the following conditions a width of the tile in the non-overlapping part of the first frequency range and the second frequency range is less than a preset value, and a frequency upper limit of the tile in the non-overlapping part of the first frequency range and the second frequency range is less than or equal to the highest frequency of the audio signal.

In a possible implementation, a frequency range corresponding to the high frequency band signal includes at least one tile, and one tile includes at least one frequency band.

In a possible implementation, the quantity of tiles in the first frequency range is a preset quantity.

In a possible implementation, the information about the tonal component includes a position quantity parameter of the tonal component, and an amplitude parameter or an energy parameter of the tonal component.

In a possible implementation, the information about the tonal component further includes a noise floor parameter of the high frequency band signal.

Figure 9:
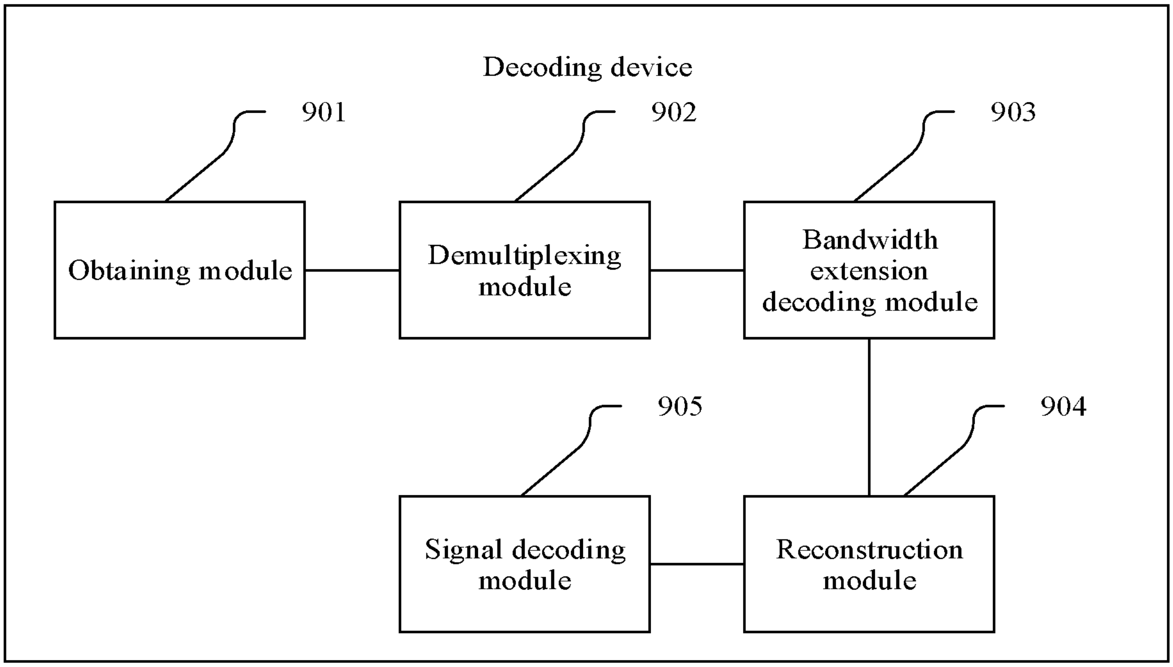
FIG. 9 is a schematic diagram of a structure of a decoding device according to this disclosure.

Second, this disclosure provides a decoding device configured to perform the decoding method shown in FIG. 7. FIG. 9 is a schematic diagram of a structure of a decoding device according to this disclosure.

The decoding device may include an obtaining module 901 configured to obtain a payload bitstream, a demultiplexing module 902 configured to perform bitstream demultiplexing on the payload bitstream to obtain a parameter of bandwidth extension and information about a tonal component of a current frame of an audio signal, a bandwidth extension decoding module 903 configured to obtain a high frequency band signal of the current frame based on the parameter of the bandwidth extension, a reconstruction module 904 configured to perform reconstruction based on the information about the tonal component and tile information to obtain a reconstructed tonal signal, where the tile information indicates a first frequency range in which tonal component reconstruction needs to be performed in the current frame, and a signal decoding module 905 configured to obtain a decoded signal of the current frame based on the high frequency band signal and the reconstructed tonal signal.

In a possible implementation, the obtaining module 901 may be further configured to obtain a configuration bitstream, and obtain the tile information based on the configuration bitstream.

In a possible implementation, the tile information includes at least one of the following: a first quantity, identification information, relationship information, or a quantity of changed tiles, where the first quantity is a quantity of tiles in the first frequency range, the identification information indicates whether the first frequency range is the same as a second frequency range corresponding to the bandwidth extension, the relationship information indicates a value relationship between the first frequency range and the second frequency range when the first frequency range is different from the second frequency range, and the quantity of changed tiles is a quantity of tiles in which there is a difference between the first frequency range and the second frequency range when the first frequency range is different from the second frequency range.

In a possible implementation, the reconstruction module 904 may be further configured to determine, based on the tile information, that a quantity of tiles in which tonal component reconstruction needs to be performed is the first quantity, determine, based on the first quantity, each tile in which tonal component reconstruction is performed in the first frequency range, and reconstruct, in the first frequency range, the tonal component based on the information about the tonal component to obtain the reconstructed tonal signal.

In a possible implementation, a lower limit of the first frequency range is the same as a lower limit of the second frequency range in which the bandwidth extension indicated by configuration information is performed. The obtaining module may be further configured to, if the first quantity is less than or equal to a second quantity, determine distribution of the tile in the first frequency range based on distribution of a tile in the second frequency range, where the second quantity is a quantity of tiles in the second frequency range, and if the first quantity is greater than the second quantity, determine that a frequency upper limit of the first frequency range is greater than a frequency upper limit of the second frequency range, determine distribution of a tile in an overlapping part of the first frequency range and the second frequency range based on distribution of the tile in the second frequency range, and determine distribution of a tile in a non-overlapping part of the first frequency range and the second frequency range in a preset manner, to obtain the tile in the first frequency range.

In a possible implementation, the tile in the non-overlapping part of the first frequency range and the second frequency range meets the following conditions: a width of the tile divided in the non-overlapping part of the first frequency range and the second frequency range is less than a preset value, and a frequency upper limit of the tile divided in the non-overlapping part of the first frequency range and the second frequency range is less than or equal to a highest frequency of the audio signal.

In a possible implementation, the information about the tonal component includes a position quantity parameter of the tonal component, and an amplitude parameter or an energy parameter of the tonal component.

In a possible implementation, the information about the tonal component further includes a noise floor parameter of the high frequency band signal.

Figure 10:
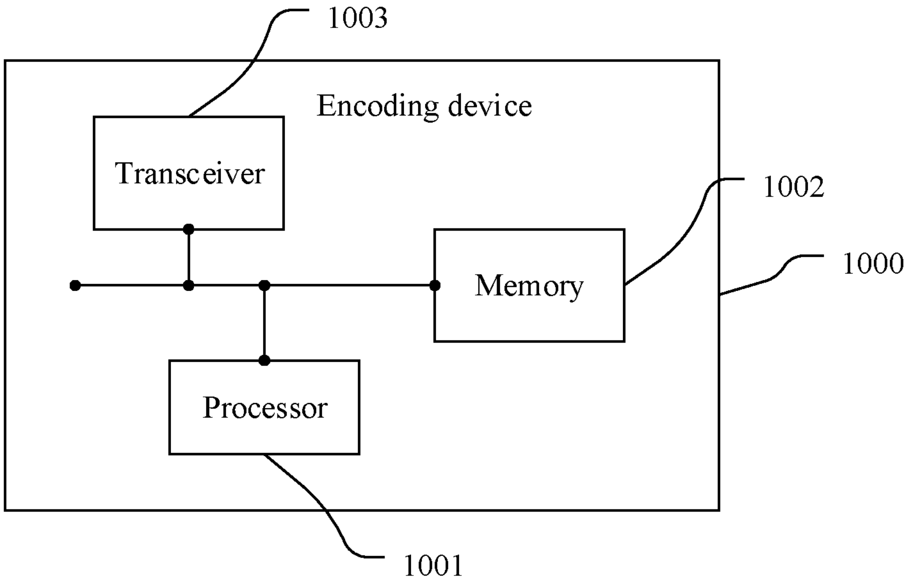
FIG. 10 is a schematic diagram of a structure of another encoding device according to this disclosure.

FIG. 10 is a schematic diagram of a structure of another encoding device 1000 according to this disclosure. The encoding device 1000 may include a processor 1001, a memory 1002, and a transceiver 1003. The processor 1001, the memory 1002, and the transceiver 1003 are interconnected through a line. The memory 1002 stores program instructions and data.

The memory 1002 stores program instructions and data that correspond to the steps performed by the encoding device in the implementation corresponding to FIG. 5.

The processor 1001 is configured to perform the steps that are performed by the encoding device and that are shown in any embodiment in FIG. 5. For example, the processor 1001 may perform steps 501 to 505 in FIG. 5.

The transceiver 1003 may be configured to receive and send data. For example, the transceiver 1003 may be configured to perform step 506 in FIG. 5.

In an implementation, the encoding device 1000 may include more or fewer components than those shown in FIG. 10. This is merely an example for description and does not constitute any limitation in this disclosure.

Figure 11:
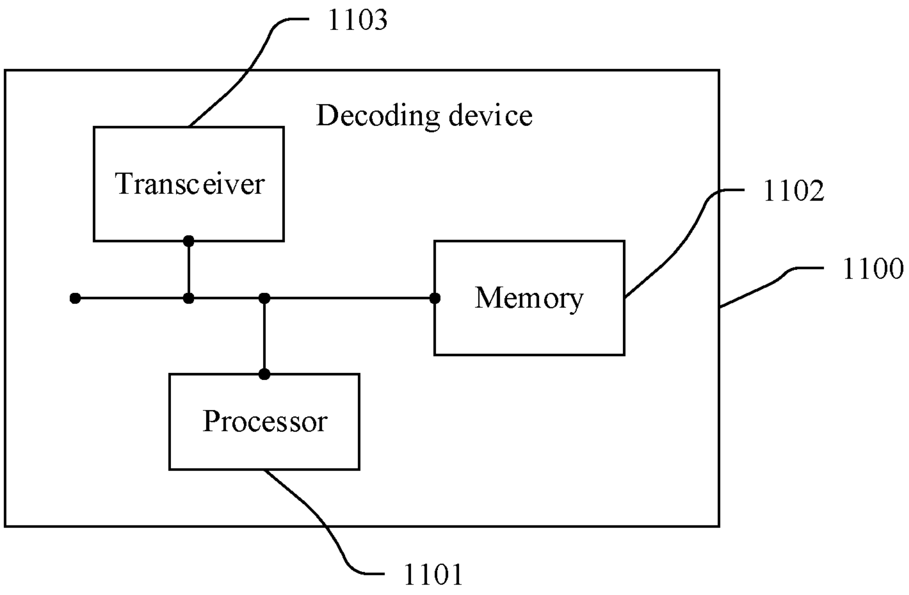
FIG. 11 is a schematic diagram of a structure of another decoding device according to this disclosure.

FIG. 11 is a schematic diagram of a structure of another decoding device 1100 according to this disclosure. The decoding device 1100 may include a processor 1101, a memory 1102, and a transceiver 1103. The processor 1101, the memory 1102, and the transceiver 1103 are interconnected through a line. The memory 1102 stores program instructions and data.

The memory 1102 stores program instructions and data that correspond to the steps performed by the decoding device in the implementation corresponding to FIG. 7.

The processor 1101 is configured to perform the steps that are performed by the decoding device and that are shown in any embodiment in FIG. 7. For example, the processor 1101 may perform steps 702, 703, 705 to 707, and the like in FIG. 7.

The transceiver 1103 may be configured to receive and send data. For example, the transceiver 1103 may be configured to perform step 701 or 704 in FIG. 7.

In an implementation, the decoding device 1100 may include more or fewer components than those shown in FIG. 11. This is merely an example for description and does not constitute any limitation in this disclosure.

This disclosure further provides a communication system. The communication system may include an encoding device and a decoding device.

The encoding device may be the encoding device shown in FIG. 8 or FIG. 10, and may be configured to perform the steps performed by the encoding device in any implementation shown in FIG. 5.

The decoding device may be the decoding device shown in FIG. 9 or FIG. 11, and may be configured to perform steps performed by the decoding device in any implementation shown in FIG. 7.

This disclosure provides a network device. The network device may be used in a device such as an encoding device or a decoding device. The network device is coupled to a memory, and is configured to read and execute instructions stored in the memory, so that the network device implements the steps of the method performed by the encoding device or the decoding device in any implementation in FIG. 5 to FIG. 7. In a possible design, the network device is a chip or a system on chip.

This disclosure provides a chip system. The chip system includes a processor configured to support an encoding device or a decoding device to implement functions in the foregoing aspects, for example, send or process data and/or information in the foregoing methods. In a possible design, the chip system further includes a memory. The memory is configured to store necessary program instructions and data. The chip system may include a chip, or may include a chip and another discrete component.

In another possible design, when the chip system is a chip in an encoding device or a decoding device, the chip includes a processing unit and a communication unit. The processing unit may be, for example, a processor, and the communication unit may be, for example, an input/output interface, a pin, a circuit, or the like. The processing unit may execute computer-executable instructions stored in a storage unit, so that the chip in the encoding device or the decoding device performs the steps of the method performed by the encoding device or the decoding device in any one of the embodiments in FIG. 5 to FIG. 7. Optionally, the storage unit is a storage unit in the chip, for example, a register or a buffer. Alternatively, the storage unit may be a storage unit in an optical line terminal (OLT), an optical network unit (ONU), or the like but outside the chip, for example, a read-only memory (ROM), another type of static storage device that can store static information and instructions, or a random-access memory (RAM).

An embodiment of this disclosure further provides a processor configured to be coupled to a memory, and configured to perform a method and a function related to the encoding device or the decoding device in any one of the foregoing embodiments.

An embodiment of this disclosure further provides a computer-readable storage medium. The computer-readable storage medium stores a computer program. When the computer program is executed by a computer, a method procedure related to the encoding device or the decoding device in any one of the foregoing method embodiments is implemented. Correspondingly, the computer may be the foregoing encoding device or decoding device.

It should be understood that the processor in the chip system, the encoding device, the decoding device, or the like in the foregoing embodiments of this disclosure, or the processor provided in the foregoing embodiments of this disclosure may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that a quantity of processors in the chip system, the encoding device, the decoding device, or the like in the foregoing embodiments of this disclosure may be one or more, and this may be adjusted based on an actual application scenario. This is merely an example for description and is not limited herein. There may be one or more memories in embodiments of this disclosure, and this may be adjusted based on an actual application scenario. This is merely an example for description and is not limited herein.

It should be further understood that the memory, the computer-readable storage medium, or the like in the chip system, the encoding device, the decoding device, or the like in the foregoing embodiments of this disclosure may be a volatile memory or a non-volatile memory, or may include both a volatile memory and a non-volatile memory. The non-volatile memory may be a ROM, a programmable ROM (PROM), an erasable PROM (EPROM), an electrically EPROM (EEPROM), or a flash memory. The volatile memory may be a RAM, used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

It should be further noted that, when the encoding device or the decoding device includes a processor (or a processing unit) and a memory, the processor in this disclosure may be integrated with the memory, or the processor may be connected to the memory through an interface. This may be adjusted based on an actual application scenario. This is not limited.

An embodiment of this disclosure further provides a computer program or a computer program product including a computer program. When the computer program is executed on a computer, the computer is enabled to implement a method procedure performed by the encoding device or the decoding device in any one of the foregoing method embodiments. Correspondingly, the computer may be the foregoing encoding device or decoding device.

All or some of the embodiments in FIG. 5 to FIG. 7 may be implemented by using software, hardware, firmware, or any combination thereof. When software is used to implement the embodiments, all or a part of the embodiments may be implemented in a form of a computer program product.

The computer program product includes one or more computer instructions. When the computer instructions are loaded and executed on a computer, the procedures or functions according to embodiments of this disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several instructions for instructing a computer device (which may be a personal computer, a server, or another network device) to perform all or some of the steps of the methods described in the embodiments in FIG. 5 to FIG. 7 of this disclosure. The storage medium includes various media that can store the program code, such as a Universal Serial Bus (USB) flash drive, a removable hard disk, a ROM, a RAM, a magnetic disk, or an optical disc.

In the specification, claims, and accompanying drawings of this disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

Names of messages/frames/information, modules, units, or the like provided in embodiments of this disclosure are merely examples, and other names may be used provided that the messages/frames/information, modules, units, or the like have same functions.

The terms used in embodiments of this disclosure are merely for the purpose of illustrating specific embodiments, and are not intended to limit the present disclosure. Terms "a", "the", and "this" of singular forms used in embodiments of this disclosure are also intended to include plural forms, unless otherwise specified in a context clearly. It should be further understood that, in the descriptions of this disclosure, "/" represents an "or" relationship between associated objects, unless otherwise specified. For example, A/B may represent A or B. A term "and/or" in this disclosure is merely an association relationship between associated objects, and represents that three relationships may exist. For example, A and/or B may represent the following three cases: only A exists, both A and B exist, and only B exists, where A and B each may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A method comprising:

encoding a plurality of frames;

obtaining a current frame of an audio signal, wherein the current frame comprises a high frequency band signal and a low frequency band signal;

performing bandwidth extension processing based on the high frequency band signal, the low frequency band signal, and preset configuration information of a bandwidth extension to obtain a parameter of the bandwidth extension of the current frame;

obtaining tile information indicating a first frequency range in which tonal component detection is to be performed on the high frequency band signal, wherein the tile information comprises a first quantity of tiles in the first frequency range and identification information indicating whether the first frequency range is the same as a second frequency range corresponding to the bandwidth extension indicated by the preset configuration information, wherein a first lower limit of the first frequency range is the same as a second lower limit of the second frequency range, wherein a first distribution of one or more tiles in the first frequency range is the same as a second distribution of one or more tiles in the second frequency range when the first quantity of tiles is less than or equal to a second quantity of tiles in the second frequency range, and wherein when the first quantity of tiles is greater than the second quantity of tiles:

a first frequency upper limit of the first frequency range is greater than a second frequency upper limit of the second frequency range;

a third distribution of one or more tiles in an overlapping part of the first frequency range and the second frequency range is the same as the second distribution; and a fourth distribution of one or more tiles in a non-overlapping part of the first frequency range and the second frequency range is based on a preset manner;

performing the tonal component detection in the first frequency range to obtain first tonal component information of the high frequency band signal;

performing bitstream multiplexing with reference to the parameter of the bandwidth extension and the first tonal component information to obtain a payload bitstream for each of the plurality of frames;

performing bitstream multiplexing with reference to the tile information to obtain a configuration bitstream comprising the tile information, wherein the configuration bitstream comprises configuration information shared by the plurality of frames; and sending the tile information to a decoding device by using the configuration bitstream.

2. The method of claim 1, wherein the preset configuration information comprises a bandwidth extension upper limit or a second quantity of tiles in the second frequency range, and wherein the method further comprises identifying the first quantity of tiles based on one or more of an encoding rate of the current frame, a quantity of channels of the audio signal, a sampling frequency of the audio signal, the bandwidth extension upper limit, or the second quantity of tiles.

3. The method of claim 2, wherein the bandwidth extension upper limit comprises one or more of a highest frequency in the second frequency range, a highest bin index in the second frequency range, a highest frequency band index in the second frequency range, or a highest tile index in the second frequency range.

4. The method of claim 2, wherein identifying the first quantity of tiles comprises:

identifying a first determining identifier of a current channel in the current frame based on the encoding rate and the quantity of channels, and identifying a first quantity of current channels based on the first determining identifier and the second quantity of tiles; or identifying a second determining identifier of the current channel based on the sampling frequency and the bandwidth extension upper limit, and identifying the first quantity of current channels based on the second determining identifier and the second quantity of tiles.

5. The method of claim 4, wherein identifying the first determining identifier comprises obtaining an average encoding rate of each channel in the current frame based on the encoding rate and the quantity of channels, and obtaining the first determining identifier based on the average encoding rate and a first threshold.

6. The method of claim 4, wherein identifying the second determining identifier comprises:

comparing whether a first highest frequency in the second frequency range comprised in the bandwidth extension upper limit is the same as a second highest frequency of the audio signal to identify the second determining identifier when the bandwidth extension upper limit comprises the first highest frequency; and comparing whether a first highest frequency band index in the second frequency range comprised in the bandwidth extension upper limit is the same as a second highest frequency band index of the audio signal to identify the second determining identifier when the bandwidth extension upper limit comprises the first highest frequency band index, wherein the second highest frequency band index is based on the sampling frequency.

7. The method of claim 4, wherein identifying the first quantity of current channels comprises:

adding one or more tiles to the second quantity of tiles in the second frequency range to obtain the first quantity of current channels when the first determining identifier and the second determining identifier meet a preset condition; and setting the second quantity of tiles corresponding to the bandwidth extension as the first quantity of current channels when the first determining identifier or the second determining identifier does not meet the preset condition.

8. The method of claim 1, wherein a width of a tile in the non-overlapping part is less than or equal to a preset value, and wherein a third frequency upper limit of the tile is less than or equal to a highest frequency of the audio signal.

9. An encoder comprising:

a memory configured to store instructions; and one or more processors coupled to the memory and configured to execute the instructions to cause the encoder to:

encode a plurality of frames;

obtain a current frame of an audio signal, wherein the current frame comprises a high frequency band signal and a low frequency band signal;

perform bandwidth extension processing based on the high frequency band signal, the low frequency band signal, and preset configuration information of a bandwidth extension to obtain a parameter of the bandwidth extension of the current frame;

obtain tile information indicating a first frequency range in which tonal component detection is to be performed on the high frequency band signal, wherein the tile information comprises at least one of:

relationship information indicating a value relationship between the first frequency range and a second frequency range when the first frequency range is different from the second frequency range, wherein the second frequency range corresponds to the bandwidth extension indicated by the preset configuration information; or a quantity of changed tiles in which there is a difference between the first frequency range and the second frequency range when the first frequency range is different from the second frequency range, wherein the tile information comprises a first quantity of tiles in the first frequency range, wherein a first lower limit of the first frequency range is the same as a second lower limit of the second frequency range, wherein a first distribution of one or more tiles in the first frequency range is the same as a second distribution of one or more tiles in the second frequency range when the first quantity of tiles is less than or equal to a second quantity of tiles in the second frequency range, and wherein when the first quantity of tiles is greater than the second quantity of tiles:

a first frequency upper limit of the first frequency range is greater than a second frequency upper limit of the second frequency range;

a third distribution of one or more tiles in an overlapping part of the first frequency range and the second frequency range is the same as the second distribution; and a fourth distribution of one or more tiles in a non-overlapping part of the first frequency range and the second frequency range is based on a preset manner;

perform the tonal component detection in the first frequency range to obtain first tonal component information of the high frequency band signal;

perform bitstream multiplexing with reference to the parameter of the bandwidth extension and the first tonal component information to obtain a payload bitstream for each of the plurality of frames;

perform bitstream multiplexing with reference to the tile information to obtain a configuration bitstream comprising the tile information, wherein the configuration bitstream comprises configuration information shared by the plurality of frames; and send the tile information to a decoding device by using the configuration bitstream.

10. The encoder of claim 9, wherein the tile information comprises a first quantity of tiles in the first frequency range, wherein the preset configuration information comprises a bandwidth extension upper limit or a second quantity of tiles in the second frequency range, and wherein the one or more processors are further configured to execute the instructions to cause the encoder to identify the first quantity of tiles based on one or more of an encoding rate of the current frame, a quantity of channels of the audio signal, a sampling frequency of the audio signal, the bandwidth extension upper limit, or the second quantity of tiles.

11. The encoder of claim 10, wherein the bandwidth extension upper limit comprises one or more of a highest frequency in the second frequency range, a highest bin index in the second frequency range, a highest frequency band index in the second frequency range, or a highest tile index in the second frequency range.

12. The encoder of claim 10, wherein the one or more processors are further configured to execute the instructions to cause the encoder to identify a first determining identifier of a current channel in the current frame based on the encoding rate and the quantity of channels, identify a second determining identifier of the current channel based on the sampling frequency and the bandwidth extension upper limit, and identify a first quantity of current channels based on the first determining identifier, the second determining identifier, and the second quantity of tiles.

13. The encoder of claim 12, wherein the one or more processors are further configured to execute the instructions to cause the encoder to identify an actual encoding rate of the current channel in the current frame based on the encoding rate and the quantity of channels and obtain the first determining identifier based on the actual encoding rate and a second threshold.

14. The encoder of claim 12, wherein the one or more processors are further configured to execute the instructions to cause the encoder to:

compare whether a first highest frequency in the second frequency range comprised in the bandwidth extension upper limit is the same as a second highest frequency of the audio signal to identify the second determining identifier when the bandwidth extension upper limit comprises the first highest frequency; and compare whether a first highest frequency band index in the second frequency range comprised in the bandwidth extension upper limit is the same as a second highest frequency band index of the audio signal to identify the second determining identifier when the bandwidth extension upper limit comprises the first highest frequency band index, wherein the second highest frequency band index is based on the sampling frequency.

15. The encoder of claim 12, wherein the one or more processors are further configured to execute the instructions to cause the encoder to:

add one or more tiles to the second quantity of tiles in the second frequency range to obtain the first quantity of current channels when both the first determining identifier and the second determining identifier of the current channel meet a preset condition; and set the second quantity of tiles corresponding to the bandwidth extension as the first quantity of current channels when the first determining identifier or the second determining identifier does not meet the preset condition.

16. A non-transitory computer-readable storage medium comprising computer-executable instructions that, when executed by one or more processors, cause an encoder to:

encode a plurality of frames;

obtain a current frame of an audio signal, wherein the current frame comprises a high frequency band signal and a low frequency band signal;

perform bandwidth extension processing based on the high frequency band signal, the low frequency band signal, and preset configuration information of a bandwidth extension to obtain a parameter of the bandwidth extension of the current frame;

obtain tile information indicating a first frequency range in which tonal component detection is to be performed on the high frequency band signal, wherein the tile information comprises a first quantity of tiles in the first frequency range and identification information indicating whether the first frequency range is the same as a second frequency range corresponding to the bandwidth extension indicated by the preset configuration information, wherein a first lower limit of the first frequency range is the same as a second lower limit of the second frequency range, wherein a first distribution of one or more tiles in the first frequency range is the same as a second distribution of one or more tiles in the second frequency range when the first quantity of tiles is less than or equal to a second quantity of tiles in the second frequency range, and wherein when the first quantity of tiles is greater than the second quantity of tiles:

a first frequency upper limit of the first frequency range is greater than a second frequency upper limit of the second frequency range;

a third distribution of one or more tiles in an overlapping part of the first frequency range and the second frequency range is the same as the second distribution; and a fourth distribution of one or more tiles in a non-overlapping part of the first frequency range and the second frequency range is based on a preset manner;

perform the tonal component detection in the first frequency range to obtain tonal component information of the high frequency band signal;

perform bitstream multiplexing with reference to the parameter of the bandwidth extension and the tonal component information to obtain a payload bitstream for each of the plurality of frames;

perform bitstream multiplexing with reference to the tile information to obtain a configuration bitstream comprising the tile information, wherein the configuration bitstream comprises configuration information shared by the plurality of frames; and send the tile information to a decoding device by using the configuration bitstream.

* * * * *